US012657958B2

(12) United States Patent
Yosef et al.

(10) Patent No.: US 12,657,958 B2
(45) Date of Patent: Jun. 16, 2026

(54) PINCH RECOGNITION AND REJECTION

(71) Applicant: Apple Inc., Cupertino, CA (US)

(72) Inventors: Itay Bar Yosef, Sunnyvale, CA (US); Bhavin Vinodkumar Nayak, San Jose, CA (US); Chao-Ming Yen, San Francisco, CA (US); Chase B. Lortie, San Francisco, CA (US); Daniel J. Brewer, San Jose, CA (US); Dror Irony, Rishon le Zion (IL); Eslam A. Mostafa, San Jose, CA (US); Guy Engelhard, Kiryat Ono (IL); Ian R. Fasel, San Francisco, CA (US); Julian K. Shutzberg, San Francisco, CA (US); Liuhao Ge, San Jose, CA (US); Lucas Soffer, Sunny Isles Beach, FL (US); Matthias M. Schroeder, Cupertino, CA (US); Mohammadhadi Kiapour, San Francisco, CA (US); Victor Belyaev, San Jose, CA (US); Yirong Tang, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/478,197

(22) Filed: Sep. 29, 2023

(65) Prior Publication Data

US 2024/0331447 A1 Oct. 3, 2024

Related U.S. Application Data

(60) Provisional application No. 63/492,587, filed on Mar. 21, 2023, provisional application No. 63/508,954, filed on Jun. 19, 2023.

(51) Int. Cl.
*G06V 40/20* (2022.01)
*G06F 3/01* (2006.01)
*G06T 7/70* (2017.01)

(52) U.S. Cl.
CPC .............. *G06V 40/28* (2022.01); *G06F 3/013* (2013.01); *G06F 3/017* (2013.01); *G06T 7/70* (2017.01)

(58) Field of Classification Search
CPC ........... G06V 40/28; G06T 7/70; G06F 3/013; G06F 3/017; G06F 3/0304
See application file for complete search history.

(56) References Cited

U.S. PATENT DOCUMENTS

| 1,173,824 A | 2/1916 | Mckee |
| 5,515,488 A | 5/1996 | Hoppe |
| (Continued) |

FOREIGN PATENT DOCUMENTS

| CA | 3033344 A1 | 2/2018 |
| CN | 104714771 A | 6/2015 |
| (Continued) |

OTHER PUBLICATIONS

"AquaSnap Window Manager: dock, snap, tile, organize," Nurgo Software, Available online at: https://www.nurgo-software.com/products/aquasnap, 5 pages, retrieved on Jun. 27, 2023.
(Continued)

*Primary Examiner* — Tracy Mangialaschi
(74) *Attorney, Agent, or Firm* — Blank Rome LLP

(57) ABSTRACT

Processing gesture input includes obtaining hand tracking data based on a set of camera frames, determining a hand pose based on the hand tracking data, and determining an intentionality classification for a gesture based on the hand pose. An input action corresponding to the gesture is enabled based on the hand pose and the intentionality classification. An occlusion classification is determined for the hand based on the hand pose and the input gesture can be determined based on the occlusion classification.

17 Claims, 12 Drawing Sheets

(56) References Cited

U.S. PATENT DOCUMENTS

| | | | |
|---|---|---|---|
| 5,524,195 A | 6/1996 | Clanton, III |
| 5,610,828 A | 3/1997 | Kodosky |
| 5,737,553 A | 4/1998 | Bartok |
| 5,740,440 A | 4/1998 | West |
| 5,751,287 A | 5/1998 | Hahn |
| 5,758,122 A | 5/1998 | Corda |
| 5,794,178 A | 8/1998 | Caid |
| 5,877,766 A | 3/1999 | Bates |
| 5,900,849 A | 5/1999 | Gallery |
| 5,933,143 A | 8/1999 | Kobayashi |
| 5,990,886 A | 11/1999 | Serdy |
| 6,061,060 A | 5/2000 | Berry |
| 6,108,004 A | 8/2000 | Medl |
| 6,112,015 A | 8/2000 | Planas |
| 6,154,559 A | 11/2000 | Beardsley |
| 6,456,296 B1 | 9/2002 | Cataudella |
| 6,584,465 B1 | 6/2003 | Zhu |
| 6,756,997 B1 | 6/2004 | Ward, III |
| 7,035,903 B1 | 4/2006 | Baldonado |
| 7,137,074 B1 | 11/2006 | Newton |
| 7,230,629 B2 | 6/2007 | Reynolds |
| 8,793,620 B2 | 7/2014 | Stafford |
| 8,803,873 B2 | 8/2014 | Yoo |
| 8,805,690 B1 | 8/2014 | Lebeau |
| 8,866,880 B2 | 10/2014 | Tan |
| 8,947,323 B1 | 2/2015 | Raffle |
| 8,970,478 B2 | 3/2015 | Johansson |
| 8,970,629 B2 | 3/2015 | Kim |
| 8,994,718 B2 | 3/2015 | Latta |
| 9,007,301 B1 | 4/2015 | Raffle |
| 9,108,109 B2 | 8/2015 | Pare |
| 9,185,062 B1 | 11/2015 | Yang |
| 9,201,500 B2 | 12/2015 | Srinivasan |
| 9,256,785 B2 | 2/2016 | Qvarfordt |
| 9,292,184 B2 | 3/2016 | Hosenpud |
| 9,400,559 B2 | 7/2016 | Latta |
| 9,448,635 B2 | 9/2016 | Macdougall |
| 9,465,479 B2 | 10/2016 | Cho |
| 9,526,127 B1 | 12/2016 | Taubman |
| 9,544,257 B2 | 1/2017 | Ogundokun |
| 9,563,331 B2 | 2/2017 | Poulos |
| 9,575,559 B2 | 2/2017 | Andrysco |
| 9,681,112 B2 | 6/2017 | Son |
| 9,684,372 B2 | 6/2017 | Xun |
| 9,734,402 B2 | 8/2017 | Jang |
| 9,778,814 B2 | 10/2017 | Ambrus |
| 9,851,866 B2 | 12/2017 | Goossens |
| 9,886,087 B1 | 2/2018 | Wald |
| 9,910,506 B2 | 3/2018 | Spiessl |
| 9,933,833 B2 | 4/2018 | Tu |
| 9,934,614 B2 | 4/2018 | Ramsby |
| 10,049,460 B2 | 8/2018 | Romano |
| 10,203,764 B2 | 2/2019 | Katz |
| 10,307,671 B2 | 6/2019 | Barney |
| 10,353,532 B1 | 7/2019 | Holz |
| 10,394,320 B2 | 8/2019 | George-Svahn |
| 10,431,216 B1 | 10/2019 | Lemon |
| 10,530,731 B1 | 1/2020 | Wu |
| 10,534,439 B2 | 1/2020 | Raffa |
| 10,664,048 B2 | 5/2020 | Cieplinski |
| 10,664,050 B2 | 5/2020 | Alcaide |
| 10,699,488 B1 | 6/2020 | Terrano |
| 10,732,721 B1 | 8/2020 | Clements |
| 10,754,434 B2 | 8/2020 | Hall |
| 10,768,693 B2 | 9/2020 | Powderly |
| 10,831,268 B1 | 11/2020 | Golard |
| 10,861,242 B2 | 12/2020 | Lacey |
| 10,890,967 B2 | 1/2021 | Stellmach |
| 10,956,724 B1 | 3/2021 | Terrano |
| 10,983,663 B2 | 4/2021 | Iglesias |
| 11,055,920 B1 | 7/2021 | Bramwell |
| 11,079,995 B1 | 8/2021 | Hulbert |
| 11,082,463 B2 | 8/2021 | Felman |
| 11,112,875 B1 | 9/2021 | Zhou |
| 11,199,898 B2 | 12/2021 | Blume |
| 11,200,742 B1 | 12/2021 | Post |
| 11,262,840 B2 | 3/2022 | Bychkov |
| 11,294,472 B2 | 4/2022 | Tang |
| 11,294,475 B1 | 4/2022 | Pinchon |
| 11,340,756 B2 | 5/2022 | Faulkner |
| 11,348,300 B2 | 5/2022 | Zimmermann |
| 11,461,973 B2 | 10/2022 | Pinchon |
| 11,496,571 B2 | 11/2022 | Berliner |
| 11,567,625 B2 | 1/2023 | Faulkner |
| 11,573,363 B2 | 2/2023 | Zou |
| 11,573,631 B2 | 2/2023 | Cederlund |
| 11,574,452 B2 | 2/2023 | Berliner |
| 11,599,239 B2 | 3/2023 | Rockel |
| 11,720,171 B2 | 8/2023 | Pastrana Vicente |
| 11,726,577 B2 | 8/2023 | Katz |
| 11,733,824 B2 | 8/2023 | Iskandar |
| 11,762,457 B1 | 9/2023 | Ikkai |
| 11,875,013 B2 | 1/2024 | Lemay |
| 12,032,803 B2 | 7/2024 | Faulkner |
| 12,053,308 B2 | 8/2024 | Alcaide |
| 12,067,688 B2 | 8/2024 | Goncalves |
| 12,099,695 B1 | 9/2024 | Smith |
| 12,113,948 B1 | 10/2024 | Smith |
| 12,118,200 B1 | 10/2024 | Shutzberg |
| 12,164,739 B2 | 12/2024 | Pastrana Vicente |
| 12,164,741 B2 | 12/2024 | De Almeida E De Vincenzo |
| 2001/0047250 A1 | 11/2001 | Schuller |
| 2002/0044152 A1 | 4/2002 | Abbott |
| 2003/0151611 A1 | 8/2003 | Turpin |
| 2003/0222924 A1 | 12/2003 | Baron |
| 2004/0059784 A1 | 3/2004 | Caughey |
| 2004/0243926 A1 | 12/2004 | Trenbeath |
| 2005/0100210 A1 | 5/2005 | Rice |
| 2005/0138572 A1 | 6/2005 | Good |
| 2005/0144570 A1 | 6/2005 | Loverin |
| 2005/0144571 A1 | 6/2005 | Loverin |
| 2005/0198143 A1 | 9/2005 | Moody |
| 2006/0080702 A1 | 4/2006 | Diez |
| 2006/0283214 A1 | 12/2006 | Donadon |
| 2008/0211771 A1 | 9/2008 | Richardson |
| 2009/0064035 A1 | 3/2009 | Shibata |
| 2009/0164219 A1 | 6/2009 | Yeung |
| 2009/0231356 A1 | 9/2009 | Barnes |
| 2010/0097375 A1 | 4/2010 | Tadaishi |
| 2010/0150526 A1 | 6/2010 | Rose |
| 2010/0188503 A1 | 7/2010 | Tsai et al. |
| 2011/0018895 A1 | 1/2011 | Buzyn |
| 2011/0018896 A1 | 1/2011 | Buzyn |
| 2011/0169927 A1 | 7/2011 | Mages |
| 2011/0216060 A1 | 9/2011 | Weising |
| 2011/0254865 A1 | 10/2011 | Yee |
| 2011/0310001 A1 | 12/2011 | Madau |
| 2012/0086624 A1 | 4/2012 | Thompson |
| 2012/0113223 A1 | 5/2012 | Hilliges |
| 2012/0151416 A1 | 6/2012 | Bell |
| 2012/0170840 A1 | 7/2012 | Caruso |
| 2012/0218395 A1 | 8/2012 | Andersen |
| 2012/0257035 A1 | 10/2012 | Larsen |
| 2013/0127850 A1 | 5/2013 | Bindon |
| 2013/0154913 A1 | 6/2013 | Genc |
| 2013/0211843 A1 | 8/2013 | Clarkson |
| 2013/0229345 A1 | 9/2013 | Day |
| 2013/0271397 A1 | 10/2013 | Macdougall |
| 2013/0278501 A1 | 10/2013 | Bulzacki |
| 2013/0283213 A1 | 10/2013 | Guendelman |
| 2013/0286004 A1 | 10/2013 | Mcculloch |
| 2013/0307775 A1 | 11/2013 | Raynor |
| 2013/0326364 A1 | 12/2013 | Latta |
| 2013/0342564 A1 | 12/2013 | Kinnebrew |
| 2013/0342570 A1 | 12/2013 | Kinnebrew |
| 2014/0002338 A1 | 1/2014 | Raffa |
| 2014/0024324 A1 | 1/2014 | Mumick |
| 2014/0028548 A1 | 1/2014 | Bychkov |
| 2014/0075361 A1 | 3/2014 | Reynolds |
| 2014/0078176 A1 | 3/2014 | Kim |
| 2014/0108942 A1 | 4/2014 | Freeman |
| 2014/0125584 A1 | 5/2014 | Xun |
| 2014/0168261 A1 | 6/2014 | Margolis |
| 2014/0184496 A1 | 7/2014 | Gribetz |

(56) References Cited

U.S. PATENT DOCUMENTS

| | | | |
|---|---|---|---|
| 2014/0184644 A1* | 7/2014 | Sharma | G06T 19/006 |
| | | | 345/633 |
| 2014/0198017 A1 | 7/2014 | Lamb | |
| 2014/0201689 A1 | 7/2014 | Bedikian | |
| 2014/0258942 A1 | 9/2014 | Kutliroff | |
| 2014/0282272 A1 | 9/2014 | Kies | |
| 2014/0320404 A1 | 10/2014 | Kasahara | |
| 2014/0347391 A1 | 11/2014 | Keane | |
| 2015/0035822 A1 | 2/2015 | Arsan | |
| 2015/0035832 A1 | 2/2015 | Sugden | |
| 2015/0042679 A1 | 2/2015 | Järvenpää | |
| 2015/0062004 A1 | 3/2015 | Rafii | |
| 2015/0067580 A1 | 3/2015 | Um | |
| 2015/0116203 A1 | 4/2015 | Narita | |
| 2015/0123890 A1 | 5/2015 | Kapur | |
| 2015/0130740 A1 | 5/2015 | Cederlund | |
| 2015/0153833 A1 | 6/2015 | Pinault | |
| 2015/0169176 A1 | 6/2015 | Cohen | |
| 2015/0177937 A1 | 6/2015 | Poletto | |
| 2015/0187093 A1 | 7/2015 | Chu | |
| 2015/0205106 A1 | 7/2015 | Norden | |
| 2015/0205358 A1 | 7/2015 | Lyren | |
| 2015/0220152 A1 | 8/2015 | Tait | |
| 2015/0227285 A1 | 8/2015 | Lee | |
| 2015/0242095 A1 | 8/2015 | Sonnenberg | |
| 2015/0255067 A1 | 9/2015 | White | |
| 2015/0287403 A1 | 10/2015 | Holzer Zaslansky | |
| 2015/0317832 A1 | 11/2015 | Ebstyne | |
| 2015/0331576 A1 | 11/2015 | Piya | |
| 2015/0332075 A1 | 11/2015 | Burch | |
| 2015/0332091 A1 | 11/2015 | Kim | |
| 2015/0338914 A1 | 11/2015 | Andrysco | |
| 2015/0350141 A1 | 12/2015 | Yang | |
| 2015/0370323 A1 | 12/2015 | Cieplinski | |
| 2016/0015470 A1 | 1/2016 | Border | |
| 2016/0018898 A1 | 1/2016 | Tu | |
| 2016/0018900 A1 | 1/2016 | Tu | |
| 2016/0025971 A1 | 1/2016 | Crow | |
| 2016/0026242 A1 | 1/2016 | Burns | |
| 2016/0026253 A1 | 1/2016 | Bradski | |
| 2016/0062636 A1 | 3/2016 | Jung | |
| 2016/0093108 A1 | 3/2016 | Mao | |
| 2016/0098094 A1 | 4/2016 | Minkkinen | |
| 2016/0133052 A1 | 5/2016 | Choi | |
| 2016/0170603 A1 | 6/2016 | Bastien | |
| 2016/0171304 A1 | 6/2016 | Golding | |
| 2016/0179336 A1 | 6/2016 | Ambrus | |
| 2016/0196692 A1 | 7/2016 | Kjallstrom | |
| 2016/0239080 A1 | 8/2016 | Marcolina | |
| 2016/0239165 A1 | 8/2016 | Chen | |
| 2016/0253063 A1 | 9/2016 | Critchlow | |
| 2016/0253821 A1 | 9/2016 | Romano | |
| 2016/0275702 A1 | 9/2016 | Reynolds | |
| 2016/0306434 A1 | 10/2016 | Ferrin | |
| 2016/0313890 A1 | 10/2016 | Walline | |
| 2016/0334875 A1 | 11/2016 | Kandadai | |
| 2016/0350973 A1 | 12/2016 | Shapira | |
| 2016/0379409 A1 | 12/2016 | Gavriliuc | |
| 2017/0038829 A1 | 2/2017 | Lanier | |
| 2017/0038837 A1 | 2/2017 | Faaborg | |
| 2017/0038849 A1 | 2/2017 | Hwang | |
| 2017/0039770 A1 | 2/2017 | Lanier | |
| 2017/0046872 A1 | 2/2017 | Geselowitz | |
| 2017/0060230 A1 | 3/2017 | Faaborg | |
| 2017/0123487 A1 | 5/2017 | Hazra | |
| 2017/0131964 A1 | 5/2017 | Baek | |
| 2017/0132694 A1 | 5/2017 | Damy | |
| 2017/0132822 A1 | 5/2017 | Marschke | |
| 2017/0153866 A1 | 6/2017 | Grinberg | |
| 2017/0206691 A1 | 7/2017 | Harrises | |
| 2017/0228130 A1 | 8/2017 | Palmaro | |
| 2017/0285737 A1 | 10/2017 | Khalid | |
| 2017/0287225 A1 | 10/2017 | Powderly | |
| 2017/0315715 A1 | 11/2017 | Fujita | |
| 2017/0344223 A1 | 11/2017 | Holzer | |
| 2017/0357390 A1 | 12/2017 | Alonso Ruiz | |
| 2017/0358141 A1 | 12/2017 | Stafford | |
| 2018/0045963 A1 | 2/2018 | Hoover | |
| 2018/0059928 A1 | 3/2018 | Westerman | |
| 2018/0075658 A1 | 3/2018 | Lanier | |
| 2018/0081519 A1 | 3/2018 | Kim | |
| 2018/0095634 A1 | 4/2018 | Alexander | |
| 2018/0095635 A1 | 4/2018 | Valdivia | |
| 2018/0101223 A1 | 4/2018 | Ishihara | |
| 2018/0114364 A1 | 4/2018 | Mcphee | |
| 2018/0150997 A1 | 5/2018 | Austin | |
| 2018/0158222 A1 | 6/2018 | Hayashi | |
| 2018/0181199 A1 | 6/2018 | Harvey | |
| 2018/0188802 A1 | 7/2018 | Okumura | |
| 2018/0210628 A1 | 7/2018 | Mcphee | |
| 2018/0239144 A1 | 8/2018 | Woods | |
| 2018/0288206 A1 | 10/2018 | Stimpson | |
| 2018/0300023 A1 | 10/2018 | Hein | |
| 2018/0307303 A1 | 10/2018 | Powderly | |
| 2018/0315248 A1 | 11/2018 | Bastov | |
| 2018/0322701 A1 | 11/2018 | Pahud | |
| 2018/0348861 A1 | 12/2018 | Uscinski | |
| 2019/0034076 A1 | 1/2019 | Vinayak | |
| 2019/0050062 A1 | 2/2019 | Chen | |
| 2019/0073109 A1 | 3/2019 | Zhang | |
| 2019/0080572 A1 | 3/2019 | Kim | |
| 2019/0088149 A1 | 3/2019 | Fink | |
| 2019/0094963 A1 | 3/2019 | Nijs | |
| 2019/0094979 A1 | 3/2019 | Hall | |
| 2019/0101991 A1 | 4/2019 | Brennan | |
| 2019/0130633 A1 | 5/2019 | Haddad | |
| 2019/0130733 A1 | 5/2019 | Hodge | |
| 2019/0146128 A1 | 5/2019 | Cao | |
| 2019/0204906 A1 | 7/2019 | Ross | |
| 2019/0227763 A1 | 7/2019 | Kaufthal | |
| 2019/0251884 A1 | 8/2019 | Burns | |
| 2019/0258320 A1 | 8/2019 | Yang | |
| 2019/0258365 A1 | 8/2019 | Zurmoehle | |
| 2019/0310757 A1 | 10/2019 | Lee | |
| 2019/0324529 A1 | 10/2019 | Stellmach | |
| 2019/0324531 A1 | 10/2019 | Eraslan | |
| 2019/0339770 A1 | 11/2019 | Kurlethimar | |
| 2019/0346678 A1 | 11/2019 | Nocham | |
| 2019/0346922 A1 | 11/2019 | Young | |
| 2019/0362557 A1 | 11/2019 | Lacey | |
| 2019/0370492 A1 | 12/2019 | Falchuk | |
| 2019/0371072 A1 | 12/2019 | Lindberg | |
| 2019/0377487 A1 | 12/2019 | Bailey | |
| 2019/0379765 A1 | 12/2019 | Fajt | |
| 2019/0384406 A1 | 12/2019 | Smith | |
| 2020/0004401 A1 | 1/2020 | Hwang | |
| 2020/0012341 A1 | 1/2020 | Stellmach | |
| 2020/0043243 A1 | 2/2020 | Bhushan | |
| 2020/0082602 A1 | 3/2020 | Jones | |
| 2020/0089314 A1 | 3/2020 | Poupyrev | |
| 2020/0098140 A1 | 3/2020 | Jagnow | |
| 2020/0098173 A1 | 3/2020 | Mccall | |
| 2020/0117213 A1 | 4/2020 | Tian | |
| 2020/0128232 A1 | 4/2020 | Hwang | |
| 2020/0129850 A1 | 4/2020 | Ohashi | |
| 2020/0142495 A1 | 5/2020 | Steinberg | |
| 2020/0159017 A1 | 5/2020 | Lin | |
| 2020/0225747 A1 | 7/2020 | Bar-Zeev | |
| 2020/0225757 A1 | 7/2020 | Schwarz | |
| 2020/0225830 A1 | 7/2020 | Tang | |
| 2020/0226814 A1 | 7/2020 | Tang | |
| 2020/0337653 A1 | 10/2020 | Alcaide | |
| 2020/0356221 A1 | 11/2020 | Behzadi | |
| 2020/0357374 A1 | 11/2020 | Verweij | |
| 2020/0387228 A1 | 12/2020 | Ravasz | |
| 2020/0409469 A1* | 12/2020 | Kannan | G06V 40/28 |
| 2021/0064142 A1 | 3/2021 | Stern | |
| 2021/0074062 A1 | 3/2021 | Madonna | |
| 2021/0090337 A1 | 3/2021 | Ravasz | |
| 2021/0096726 A1 | 4/2021 | Faulkner | |
| 2021/0125414 A1 | 4/2021 | Berkebile | |
| 2021/0141525 A1 | 5/2021 | Piemonte | |
| 2021/0191600 A1 | 6/2021 | Lemay | |
| 2021/0263593 A1 | 8/2021 | Lacey | |

(56)           References Cited

U.S. PATENT DOCUMENTS

| | | |
|---|---|---|
| 2021/0295602 A1 | 9/2021 | Scapel |
| 2021/0303074 A1 | 9/2021 | Vanblon |
| 2021/0319617 A1 | 10/2021 | Ahn |
| 2021/0327140 A1 | 10/2021 | Rothkopf |
| 2021/0339134 A1 | 11/2021 | Knoppert |
| 2021/0350564 A1 | 11/2021 | Peuhkurinen |
| 2021/0352172 A1 | 11/2021 | Kim |
| 2021/0357073 A1 | 11/2021 | Kandadai |
| 2021/0375022 A1 | 12/2021 | Lee |
| 2022/0011855 A1 | 1/2022 | Hazra |
| 2022/0030197 A1 | 1/2022 | Ishimoto |
| 2022/0035441 A1* | 2/2022 | Yu .......................... G06F 18/251 |
| 2022/0050432 A1 | 2/2022 | Kim |
| 2022/0070241 A1 | 3/2022 | Yerli |
| 2022/0083197 A1 | 3/2022 | Rockel |
| 2022/0091722 A1 | 3/2022 | Faulkner |
| 2022/0091723 A1 | 3/2022 | Faulkner |
| 2022/0092862 A1 | 3/2022 | Faulkner |
| 2022/0101593 A1 | 3/2022 | Rockel |
| 2022/0101612 A1 | 3/2022 | Palangie |
| 2022/0104910 A1 | 4/2022 | Shelton, IV |
| 2022/0121344 A1 | 4/2022 | Pastrana Vicente |
| 2022/0130107 A1 | 4/2022 | Lindh |
| 2022/0137705 A1 | 5/2022 | Hashimoto |
| 2022/0155909 A1 | 5/2022 | Kawashima |
| 2022/0157083 A1 | 5/2022 | Jandhyala |
| 2022/0187907 A1 | 6/2022 | Lee |
| 2022/0191570 A1 | 6/2022 | Reid |
| 2022/0197403 A1 | 6/2022 | Hughes |
| 2022/0229524 A1 | 7/2022 | Mckenzie |
| 2022/0229534 A1 | 7/2022 | Terre |
| 2022/0236795 A1* | 7/2022 | Jonker ..................... G06F 3/011 |
| 2022/0245888 A1 | 8/2022 | Singh |
| 2022/0253149 A1 | 8/2022 | Berliner |
| 2022/0255995 A1 | 8/2022 | Berliner |
| 2022/0276720 A1 | 9/2022 | Yasui |
| 2022/0317776 A1 | 10/2022 | Sundstrom |
| 2022/0326837 A1 | 10/2022 | Dessero |
| 2022/0375269 A1 | 11/2022 | Wu |
| 2022/0413691 A1 | 12/2022 | Becker |
| 2022/0414999 A1 | 12/2022 | Ravasz |
| 2023/0004216 A1 | 1/2023 | Rodgers |
| 2023/0008537 A1 | 1/2023 | Henderson |
| 2023/0021861 A1 | 1/2023 | Fujiwara |
| 2023/0056020 A1* | 2/2023 | Zhang ..................... G06F 3/016 |
| 2023/0068660 A1 | 3/2023 | Brent |
| 2023/0069764 A1 | 3/2023 | Renee |
| 2023/0074080 A1 | 3/2023 | Miller |
| 2023/0092282 A1 | 3/2023 | Boesel |
| 2023/0093979 A1 | 3/2023 | Stauber |
| 2023/0133579 A1 | 5/2023 | Yuhu |
| 2023/0152935 A1 | 5/2023 | Mckenzie |
| 2023/0154122 A1 | 5/2023 | Dascola |
| 2023/0163987 A1 | 5/2023 | Young |
| 2023/0168788 A1 | 6/2023 | Faulkner |
| 2023/0185426 A1 | 6/2023 | Philipp |
| 2023/0186577 A1 | 6/2023 | Philipp |
| 2023/0206921 A1 | 6/2023 | Edelsburg |
| 2023/0244316 A1* | 8/2023 | Schwarz ................. G06F 3/017 |
| | | 345/156 |
| 2023/0244857 A1 | 8/2023 | Weiss |
| 2023/0273706 A1 | 8/2023 | Smith |
| 2023/0274504 A1 | 8/2023 | Ren |
| 2023/0305635 A1 | 9/2023 | Han |
| 2023/0308610 A1 | 9/2023 | Henderson |
| 2023/0315385 A1 | 10/2023 | Akmal |
| 2023/0316634 A1 | 10/2023 | Shih-Sang |
| 2023/0325004 A1 | 10/2023 | Burns |
| 2023/0350539 A1 | 11/2023 | Owen |
| 2023/0359199 A1 | 11/2023 | Adachi |
| 2023/0384907 A1 | 11/2023 | Boesel |
| 2023/0388357 A1 | 11/2023 | Faulkner |
| 2024/0086031 A1 | 3/2024 | Palangie |
| 2024/0086032 A1 | 3/2024 | Palangie |
| 2024/0087256 A1 | 3/2024 | Hylak |
| 2024/0094863 A1 | 3/2024 | Smith |
| 2024/0094866 A1 | 3/2024 | Lemay |
| 2024/0095984 A1 | 3/2024 | Ren |
| 2024/0103613 A1 | 3/2024 | Chawda |
| 2024/0103684 A1 | 3/2024 | Yu |
| 2024/0103707 A1 | 3/2024 | Henderson |
| 2024/0104836 A1 | 3/2024 | Dessero |
| 2024/0104873 A1 | 3/2024 | Pastrana Vicente |
| 2024/0104877 A1 | 3/2024 | Henderson |
| 2024/0111479 A1 | 4/2024 | Paul |
| 2024/0119682 A1 | 4/2024 | Rudman |
| 2024/0192764 A1 | 6/2024 | Dascola |
| 2024/0221291 A1 | 7/2024 | Henderson |
| 2024/0291953 A1 | 8/2024 | Cerra |
| 2024/0310971 A1 | 9/2024 | Kawashima |
| 2024/0393876 A1 | 11/2024 | Chawda |
| 2024/0402800 A1 | 12/2024 | Shutzberg |
| 2024/0402821 A1 | 12/2024 | Meyer |
| 2024/0411444 A1 | 12/2024 | Shutzberg |
| 2025/0348187 A1 | 11/2025 | Lortie |

FOREIGN PATENT DOCUMENTS

| | | |
|---|---|---|
| CN | 105264461 A | 1/2016 |
| CN | 105264478 A | 1/2016 |
| CN | 106575149 A | 4/2017 |
| CN | 108633307 A | 10/2018 |
| CN | 110476142 A | 11/2019 |
| CN | 110673718 A | 1/2020 |
| CN | 109491508 B | 8/2022 |
| EP | 2741175 A2 | 6/2014 |
| EP | 2947545 A1 | 11/2015 |
| EP | 3503101 A1 | 6/2019 |
| EP | 3588255 A1 | 1/2020 |
| EP | 3654147 A1 | 5/2020 |
| JP | H1051711 A | 2/1998 |
| JP | 2005215144 A | 8/2005 |
| JP | 2006146803 A | 6/2006 |
| JP | 2012234550 A | 11/2012 |
| JP | 2013196158 A | 9/2013 |
| JP | 201354358 A | 12/2013 |
| JP | 2013257716 A | 12/2013 |
| JP | 2014514652 A | 6/2014 |
| JP | 2015515040 A | 5/2015 |
| JP | 2015118332 A | 6/2015 |
| JP | 2016194744 A | 11/2016 |
| JP | 2017027206 A | 2/2017 |
| JP | 201758528 A | 3/2017 |
| JP | 20185517 A | 1/2018 |
| JP | 2018005516 A | 1/2018 |
| JP | 2018106499 A | 7/2018 |
| JP | 2019169154 A | 10/2019 |
| JP | 2022053334 A | 4/2022 |
| KR | 20160012139 A | 2/2016 |
| KR | 20190100957 A | 8/2019 |
| WO | 2010026519 A1 | 3/2010 |
| WO | 2019142560 A1 | 7/2019 |
| WO | 2019217163 A1 | 11/2019 |
| WO | 2020066682 A1 | 4/2020 |
| WO | 2021173839 A1 | 9/2021 |
| WO | 2021202783 A1 | 10/2021 |
| WO | 2022046340 A1 | 3/2022 |
| WO | 2022055822 A1 | 3/2022 |
| WO | 2022066399 A1 | 3/2022 |
| WO | 2022066535 A2 | 3/2022 |
| WO | 2022146936 A1 | 7/2022 |
| WO | 2022146938 A1 | 7/2022 |
| WO | 2022164881 A1 | 8/2022 |
| WO | 2023141535 A1 | 7/2023 |

OTHER PUBLICATIONS

Bhowmick, S, "Explorations on Body-Gesture Based Object Selection on HMD Based VR Interfaces for Dense and Occluded Dense Virtual Environments," Report: State of the Art Seminar, Department of Design Indian Institute of Technology, Guwahati, 25 pages, Nov. 2018.

(56) References Cited

OTHER PUBLICATIONS

Bolt, R.A. et al.,, "Two-Handed Gesture in Multi-Modal Natural Dialog," Uist '92, 5th Annual Symposium on User Interface Software And Technology. Proceedings Of the ACM Symposium on User Interface Software And Technology, Monterey, pp. 7-14, Nov. 1992.

Brennan, D., "4 Virtual Reality Desktops for Vive, Rift, and Windows VR Compared," Road to VR, Available online at: https://www.roadtovr.com/virtual-reality-desktop-compared-oculus-rift-htc-vive/, retrieved on Jun. 29, 2023.

Camalich, S., "CSS Buttons with Pseudo-elements," available online at: https://tympanus.net/codrops/2012/01/11/css-buttons-with-pseudo-elements/, 8 pages, retrieved on Jul. 12, 2017.

Chatterjee, I. et al., "Gaze+Gesture: Expressive, Precise and Targeted Free-Space Interactions," ICMI '15, 8 pages, 2015.

Home | Virtual Desktop, Virtual Desktop, https://www.vrdesktop.net, 4 pages, retrieved Jun. 29, 2023.

Lin, J. et al., "Towards Naturally Grabbing and Moving Objects in VR," IS&T International Symposium on Electronic Imaging and The Engineering Reality of Virtual Reality, 6 pages, 2016.

Mcgill, M. et al, "Expanding The Bounds Of Seated Virtual Workspaces," University of Glasgow, Available online at: https://core.ac.uk/download/pdf/323988271.pdf, 44 pages, retrieved on Jun. 27, 2023.

Pfeuffer, K. et al, "Gaze + Pinch Interaction in Virtual Reality," In Proceedings of SUI '17, Brighton, United Kingdom, pp. 99-108, 2017.

* cited by examiner

PINCH RECOGNITION AND REJECTION

BACKGROUND

Some devices can generate and present Extended Reality (XR) Environments. An XR environment may include a wholly or partially simulated environment that people sense and/or interact with via an electronic system. In XR, a subset of a person's physical motions, or representations thereof, are tracked, and in response, one or more characteristics of one or more virtual objects simulated in the XR environment are adjusted in a manner that comports with realistic properties. Some XR environments allow multiple users to interact with virtual objects or with each other within the XR environment. For example, users may use gestures to interact with components of the XR environment. However, what is needed is an improved technique to manage tracking of a hand performing the gesture.

DETAILED DESCRIPTION

Figure 1:
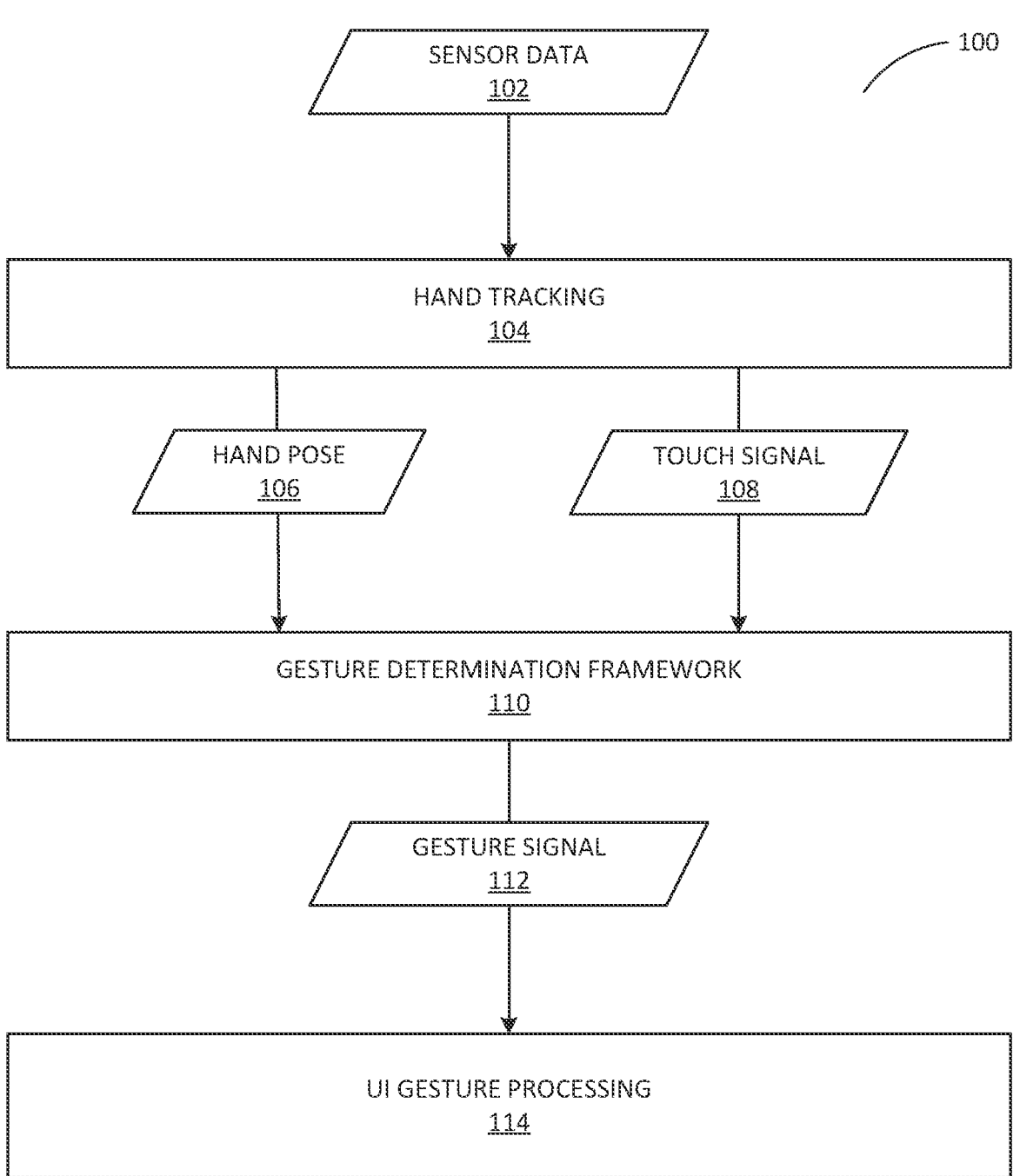
FIG. 1 shows a flow diagram of a technique for detecting input gestures, in accordance with some embodiments.

This disclosure pertains to systems, methods, and computer readable media to enable gesture recognition and input. In some enhanced reality contexts, image data and/or other sensor data can be used to detect gestures by tracking hand data. For some gestures, such as a pinch, the hand pose information is obtained to determine whether a touch occurs between two fingers, or between two portions of a hand. A framework is applied to determine intentionality of the touch, intentionality may be determined based on hand tracking data. In some embodiments other considerations may be used, such as gaze information, other peripheral object information, user interface (UI) components, or other contextual information. The framework can then determine whether the input action should be enabled based on the intentionality of the gesture.

In some enhanced reality contexts, image data and/or other sensor data can be used to detect gestures by tracking hand data. User input can fail or be unreliable when part or all of the hand is occluded. When a hand becomes occluded or substantially occluded, a gesture can be "locked" so that the state of the hand prior to the occlusion is used for a given frame. In some embodiments, an amount of occlusion can be determined and considered when identifying a gesture.

In the following disclosure, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an XR environment refers to a wholly or partially simulated environment that people sense and/or interact with via an electronic device. For example, the XR environment may include Augmented Reality (AR) content, Mixed Reality (MR) content, Virtual Reality (VR) content, and/or the like. With an XR system, a subset of a person's physical motions, or representations are tracked, and in response, one or more characteristics of one or more virtual objects simulated in the XR environment, are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and adjust graphical content and an acoustic field presented to the person in a manner, similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include: head-mountable systems, projection-based systems, heads-up displays (HUD), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the following description for purposes of explanation, numerous specific details are set forth in order to provide a thorough understanding of the disclosed concepts. As part of this description, some of this disclosure's drawings represent structures and devices in block diagram form, in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints) and that these goals may vary from one implementation to another. It will also be appreciated that such development efforts might be complex and time-consuming but would nevertheless, be a routine undertaking for those of ordinary skill in the design and implementation of graphics modeling systems having the benefit of this disclosure.

FIG. 1 shows a flow diagram of a technique for detecting input gestures, in accordance with some embodiments. In particular, FIG. 1 shows a gesture estimation pipeline in the form of flow diagram 100 in which a user input gesture is recognized and processed. Although the flow diagram shows various components which are described as performing particular processes, it should be understood that the flow of the diagram may be different in accordance with some embodiments, and the functionality of the components may be different in accordance with some embodiments.

The flow diagram 100 begins with sensor data 102. In some embodiments, the sensor data may include image data and/or depth data captured of a user's hand or hands. In some embodiments, the sensor data may be captured from sensors on an electronic device, such as outward facing cameras on a head mounted device, or cameras otherwise configured in an electronic device to capture sensor data including a user's hands. According to one or more embodiments, the sensor data may be captured by one or more cameras, which may include one or more sets of stereoscopic cameras. In some embodiments, the sensor data 102 may include additional data collected by an electronic device and related to the user. For example, the sensor data may provide location data for the electronic device, such as position and orientation of the device.

In some embodiments, the sensor data 102 may be applied to a hand tracking network 104. The hand tracking network may be a network trained to estimate a physical state of a user's hand or hands. In some embodiments, the hand tracking network 104 predicts a hand pose 106. The hand pose may be a classified pose of a hand based on the estimated physical state, or may provide some other form of data indicative of a pose of a hand. For example, in some embodiments, the hand pose data 106 may include an estimation of joint location for a hand. Further, in some embodiments, the hand tracking network 104 may be trained to provide an estimation of an estimate of a device location, such as a headset, and/or simulation world space.

In some embodiments, the hand tracking network 104 may further be configured to provide touch data. The touch data may include a prediction as to whether, for a given frame or frames, a touch is occurring between two regions on the hand. For example, a machine learning model may be trained to predict whether a thumb pad and index finger are in contact. For purposes of the description herein, a touch refers to contact between two surfaces regardless of intent, whereas a pinch is defined as a touch being performed with the intent of producing a corresponding input action. As will be described in greater detail below, in some embodiments, the hand tracking may predict whether a touch occurs based on the sensor data 102 and/or hand pose data 106.

According to one or more embodiments, gesture determination framework 110 provides a determination as to whether a particular pose presented in the sensor data 102 is intentional. That is, a determination is made as to whether a classified pose of the hand (for example, based on or provided by the hand pose data 106) is intentional. When the determined hand pose includes a touch, such as a pinch, then the gesture determination framework 110, may use the touch signal 108 provided by the hand tracking network 104 in determining whether an intentional gesture is performed.

In some embodiments, the gesture determination framework 110 may utilize additional data not explicitly depicted in FIG. 1. For example, the gesture determination framework 110 may receive signals such as user interface (UI) geometry, gaze estimation, events generated by connected peripherals, user interaction with objects, and the like. As will be described in FIG. 3, the gesture determination framework 110 may consider the various features from the inputs to make a determination for a particular input gesture, whether the gesture is intentional. This determination may be transmitted in the form of a gesture signal 112 to a UI gesture processing module 114. The gesture signal may indicate, whether or not an intentional input gesture has occurred. In some embodiments, the gesture signal 112 may also be used to indicate whether a previous gesture signal should be cancelled. This may occur, for example, if a user shifts their position, sets their hands down, or the like.

The UI gesture processing module 114 may be configured to enable a user input action based on the gesture signal 112. A particular gesture, such as a pinch, may be associated with a selection action of a UI component or the like. In some embodiments, if a cancellation signal is received corresponding to a gesture signal 112 which has already been initiated, the system can process that gesture differently than if it were not cancelled. For example, a UI component can be shown as selected but not activated, etc. As another example, a previously initiated stroke drawn by the user can be truncated or undone.

Figure 2:
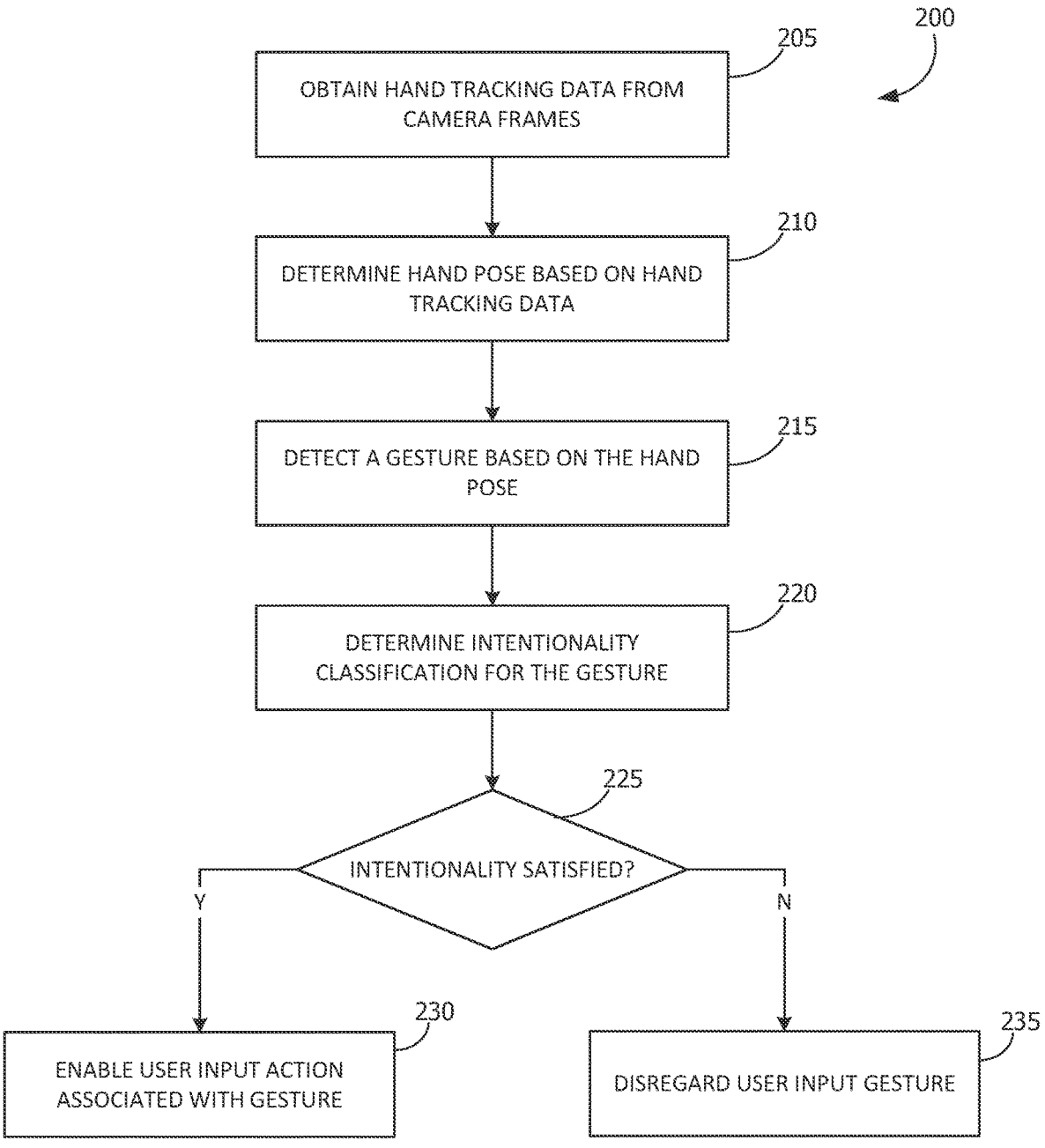
FIG. 2 shows a flowchart of a technique for enabling gesture input, in accordance with some embodiments.

FIG. 2 shows a flowchart of a technique for enabling gesture input, in accordance with some embodiments. In particular, the flowchart presented in FIG. 2 depicts an example technique for detecting and processing gestures, as described above with respect to FIG. 1. For purposes of explanation, the following steps will be described as being performed by particular components. However, it should be understood, that the various actions may be performed by alternate components. In addition, the various actions may be performed in a different order. Further, some actions may be performed simultaneously, and some may not be required, or others may be added.

The flowchart 200 begins at block 205, where hand tracking data is obtained from one or more camera frames. According to one or more embodiments, the hand tracking data may include image data and/or depth data. The hand tracking data may be obtained from one or more cameras, including stereoscopic cameras or the like. In some embodiments, the hand tracking data may include sensor data captured by outward facing cameras of a head mounted device. The hand tracking data may be obtained from hand tracking network 104, or another source which generates hand tracking data from camera or other sensor data.

At block 210, a hand pose is determined based on the hand tracking data. As described above, the device may consider gaze information, UI geometry, contextual information, or the like. For example, gaze information may be obtained from or derived from gaze tracking data. Gaze tracking data may include characteristics of a gaze determined from sensor data, such as an eye location, a target of a gaze, an eye tracking movement, or the like. The hand pose data may include, joint locations and/or orientations, skeletal features, and the like. In some embodiments, other data can be provided by the hand pose network which is derived from the determination of the hand pose. For example, a relative location of a device to the hand may be determined based on the hand pose data. In doing so, the hand tracking network may provide an estimated location for a device.

The flowchart 200 continues to block 215, where a gesture is detected based on the hand pose. In some embodiments, the device may select a gesture from among a set of predefined gesture classifications based on the pose. In some embodiments, the gesture may be based on hand pose in a single frame (or, in some embodiments, stereoscopic frame pair), over a series of frames, or the like. The gesture may be determined, for example, by a gesture determination framework 110, as described above.

At block 220, the device determines an intentionality classification for the gesture. In some embodiments, the gesture determination framework 110 can further determine the intentionality of the particular gesture. The intentionality may indicate that by performing the gesture, the user intended to enable an associated input action. This determination may reduce the number of unintentional inputs by the user. Intentionality can be determined based on the hand tracking data, as well as additional data, as will be described below with respect to FIG. 3. In some embodiments, intentionality may be determined based on a current camera frame, as well as other camera frames capturing the gesture, or camera frames capturing a hand before and/or after the gesture. For example, a series or set of camera frames comprising the current frames may be considered. Intentionality may be determined in the form of an intentionality score which must satisfy a threshold score in order for a gesture signal to be passed to the UI gesture processing module. Alternatively, the intentionality may be determined to be satisfied as part of a determination of the gesture. That is, the gesture determination framework may determine the gesture and the intentionality of the gesture and a single process, concurrently, and the like.

If at block 225, intentionality is satisfied, the flowchart proceeds to block 230, and the user input action associated with the gesture is enabled. As described above, enabling the user input action may include triggering a UI gesture processing module 114 to initiate an input action associated with gesture. By contrast, if intentionality is not satisfied at block 225, the flowchart concludes at block 235, where the user input gesture is disregarded. The user input gesture may be disregarded by actively transmitting a signal that the detected gesture was not intentional, or by refraining from transmitting the gesture signal, for example, from the gesture determination framework 110 to the UI gesture processing module 114.

Although not shown in some embodiments, if the intentionality is not satisfied at block 225, but an action associated with gesture has already been initiated (for example, from a satisfactory intentionality score a prior frame), then a current input action associated with a gesture may be canceled. As described above, this may occur using a cancellation signal. The cancellation signal may prompt the UI gesture processing module 114 to process the input action differently than if the gesture signal had not been canceled. For example, the input action may cease to occur, may be undone, etc. In some embodiments, the UI gesture processing module 114 may present an indication that the gesture was recognized (for example, by highlighting an associated UI component), but will refrain from completing the input action.

Figure 3:
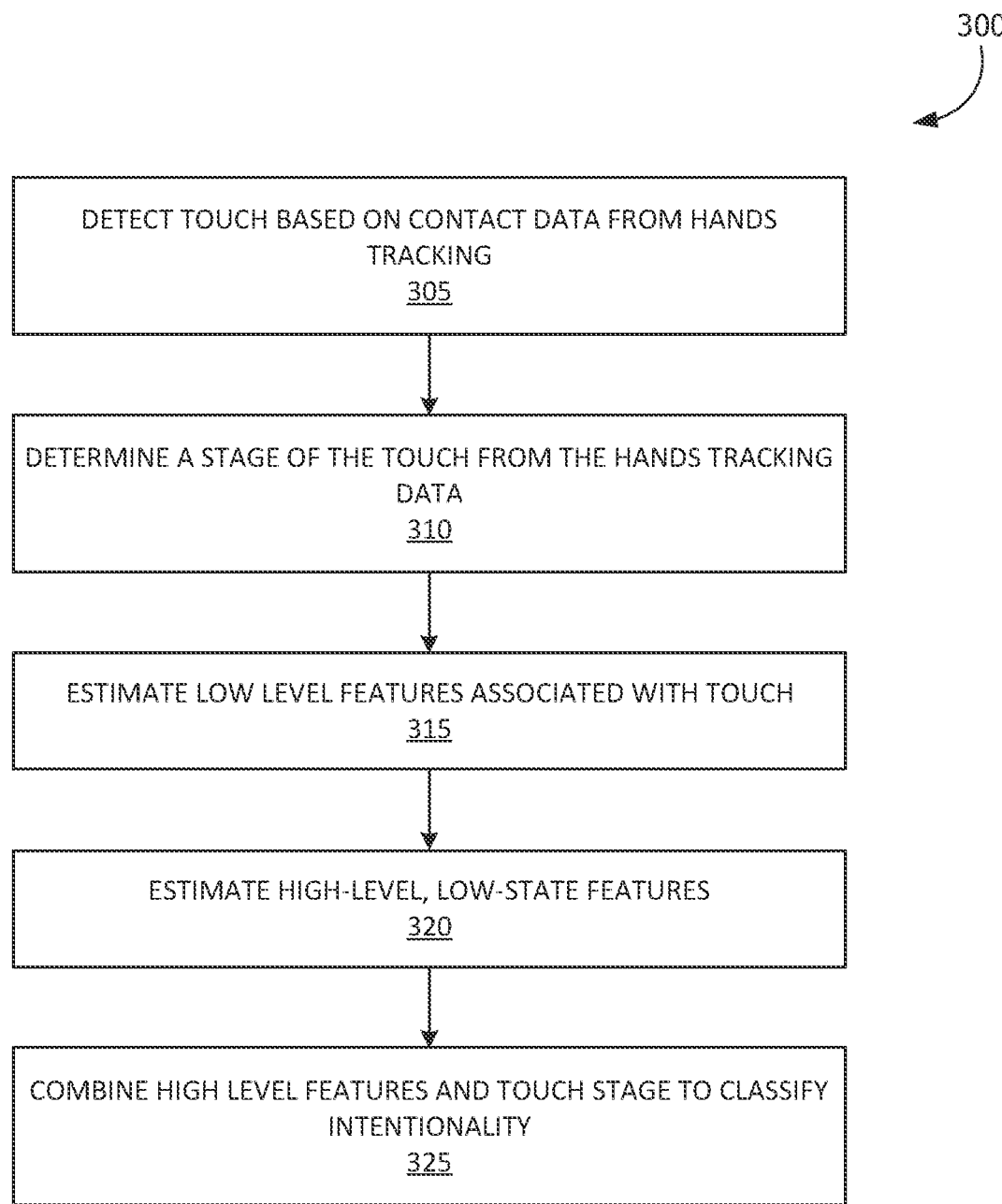
FIG. 3 shows a flowchart of a technique for classifying intentionality of a gesture, in accordance with some embodiments.

As described above, the gesture determination framework may be configured to generate a classification of intentionality for a gesture. The gesture determination framework 110 may be configured to estimate a pose or gesture of a hand, and determine whether the gesture was intended to be used for triggering a user input action. FIG. 3 shows a flowchart of a technique for classifying intentionality of a gesture, in accordance with some embodiments. For purposes of explanation, the following steps will be described as being performed by particular components of FIG. 1. However, it should be understood that the various actions may be performed by alternate components. The various actions may be performed in a different order. Further, some actions may be performed simultaneously, and some may not be required, or others may be added.

The flowchart 300 begins at block 305, where a touch event is detected based on context data from the hand tracking network. The touch event may be detected, for example, based on a touch signal 108 received from the hand tracking network 104. According to some embodiments, some gestures may require touch, such as a pinch or the like. Further, multiple types of pinches may be recognized with different kinds of touch. According to some embodiments, not every gesture may require a touch. As such, the touch may not be detected, or the touch signal may indicate that the touch occurs. In some embodiments, the touch signal may not be received, or may otherwise be ignored and a gesture may still be recognized.

The touch event may be determined in a number of ways. In some embodiments, a touch event can be predicted for a given frame based on a trained network, a set of heuristics, or the like. In some embodiments, the touch event may include multiple phases, such as a pinch-down and a pinch-up. As such, a touch signal may indicate a touch is occurring even when contact between two fingers is not confirmed. As another example, as will be described below, a touch event may be signaled in some cases when at least part of the hand is occluded. In some embodiments, the contact may be detected for a particular frame of a series of frames determined to be part of the touch event. Each frame, or a subset of the frames, may be associated with a touch signal determination.

The flowchart 300 continues to block 310, where a touch stage is determined from hand tracking data. The touch stage may indicate, for a given frame, what phase of the touch action the fingers are currently in. According to some embodiments, the features of interest in determining intentionality may vary depending upon a current state of a gesture. For gestures that include a pinch or other touch action, the stage in which the gesture is currently in may affect the ability to enable, cancel, or reject an associated input action. Some examples of touch stage include an idle state, an entry state in which a contact event is beginning or anticipated, such as a pinch down phase. A hold state, where a pinch is currently occurring, and an exit stage, for example when a pinch up occurs for the pinch is ending. The various touch stages will be described in greater detail below with respect to FIG. 4. According to one or more embodiments, each frame in a set of frames may be determined to be associated with a particular touch stage during a touch event.

At block 315, low-level features are estimated in association with the touch. The low-level features may be determined from the hand tracking data and/or additional data may include estimations of what a hand is doing during the frame. For example, other sources of data include pose information for a device capturing the hand tracking data, hand pose, UI geometry, etc. In some embodiments, the low-level features are determined without regard for intent. Examples of low-level features include, for example, a pinch speed on pinch down, a measure of wrist flex, finger curl, proximity of hand to head, velocity of hand, and the like.

The flowchart 300 continues to block 320, where high-level, low state features are estimated. The high-level low-state features may include, modal features which estimate what a user is doing during the touch in order to determine intentionality. In some embodiments, the high-level features may be features which are interoperable, and which can be individually validated. Examples include, estimates as to whether hands are using one or more peripheral devices, a frequency of a repetition of a gesture (for example, if a user is pinching quickly), if hand is holding an object, if a hand is in a resting position, a particular pinch or gesture style (i.e., a pinch using pads of two fingers, or using the side of a finger). In some embodiments, the high-level features may be based on user activity, such as a user fidgeting, talking, or reading.

According to one or more embodiments, the high-level features may be determined based on the hand tracking data, the determined touch stage, and/or the estimated basic features. In some embodiments, the high-level features may directly determine intentionality of an action. In particular, the high-level features may indicate that a user is in a particular use mode. As an example, if a user is in a peripheral use mode, the user is determined to be using a peripheral device such as a keyboard. A pinch or other gesture by thereby be rejected, or the gesture may be determined to be unintentional. In another example, a user may be determined to be in a self-interaction mode when a hand is performing actions within a threshold distance of another part of the user's body. This may occur, for example, when a user is using one hand to scratch the other arm, pull up a sleeve, or the like. These actions may appear to include pinches or other gestures, but because the actions occur near another part of the user's body, the gestures may be ignored as unintentional input gestures.

The flowchart concludes at block 325, where the gesture determination framework 110 combines high level features and the touch stage to classify intentionality for the gesture captured by the touch event. In some embodiments, the gesture determination framework 110, uses a conditional combination of high-level features and touch stage to classify intentionality. The classification can then be used to signal the gesture to be processed as an input gesture (thereby activating an associated UI input action), cancel the associated action if the gesture is determined to be unintentional (for example, if a UI action associated with the gesture has already been initiated), or disregard the gesture.

Figure 4:
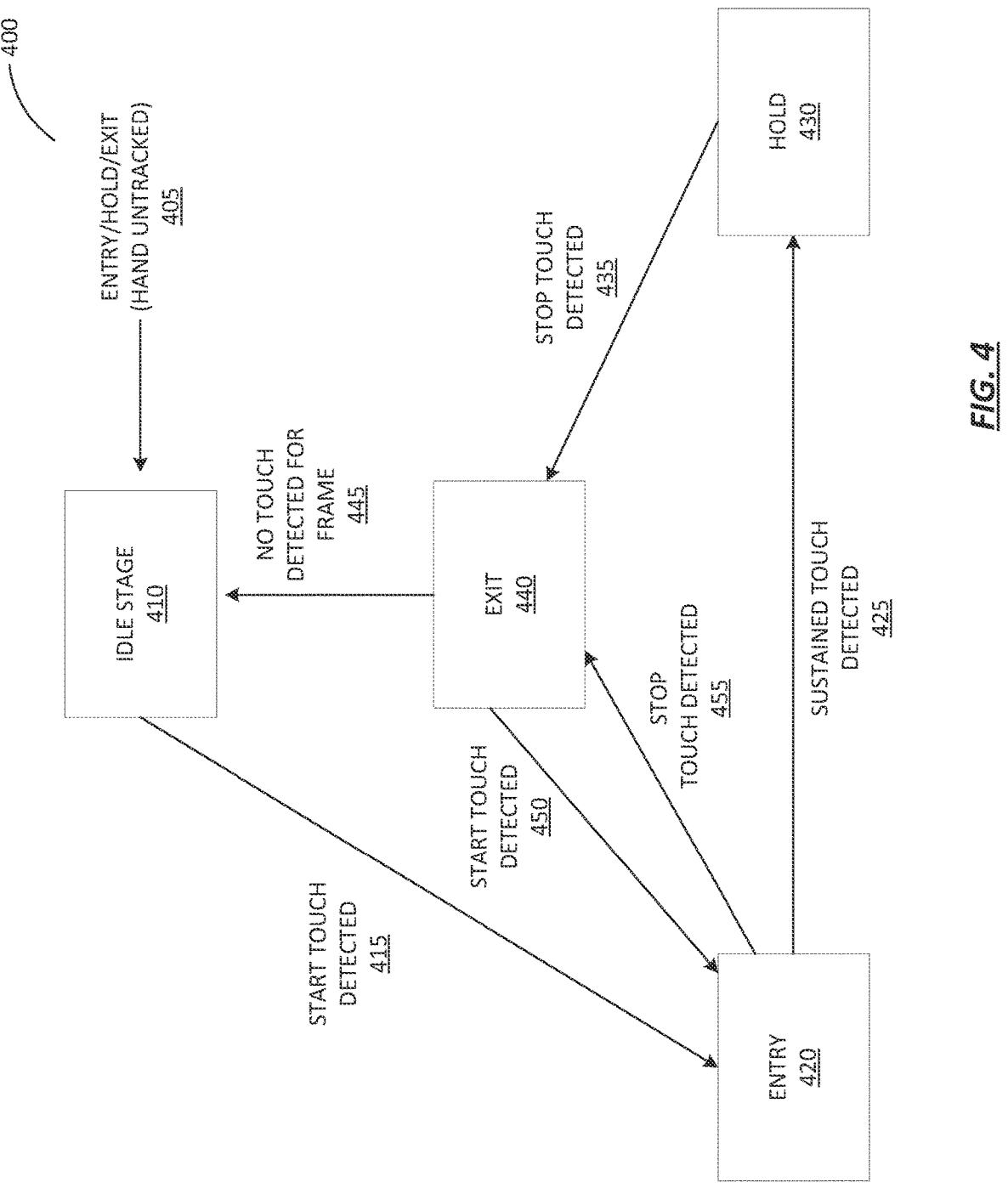
FIG. 4 shows a flow diagram of a technique for classifying a touch stage, in accordance with some embodiments.

FIG. 4 shows a flow diagram of a technique for classifying a touch stage, in accordance with some embodiments. FIG. 4 depicts a flow diagram for determining a touch stage, as described above with respect to block 310 of FIG. 3. In particular, FIG. 4 can be interpreted as a state machine to determine a state of a touch in a given frame. For purposes of the description in FIG. 4, a touch indicates a contact between two portions of the hand. For example, and without limitation, a contact event between two fingers, or a contact event between a finger pad and another portion of the hand may be considered a touch.

In some embodiments, the particular touch stage or movement between touch stage, may be determined based on a set of heuristics using image data and/or depth data from a particular frame, for example, from hand tracking data. As will be described below with respect to FIG. 5, in some embodiments, the touch stage may be determined using machine learning models.

The flow 400 begins at 405, where a hand is untracked. The hand may be untracked, for example, during idle stage 410. Because the hand is untracked for this stage, the touch stage may actually be in an entry, hold, or exit stage, but the actual stage may go unrecognized as the hand is not being tracked. The hand may be untracked, for example, when a hand tracking process is not running, or when a touch detection process is not running. That is, hand tracking may be occurring for other purposes, but not for touch detection in accordance with one or more embodiments. As another example, the touch stage may be tracked at a different power level than during an active tracking session. In the idle stage 410, a touch may not have been detected between two portions of the hand for some predetermined amount of time. For example, two fingers may not have touched within a certain number of prior frames.

Upon the tracked hand moving in such a manner that a touch may be anticipated, then the flow continues to block 415, where the start of a touch is detected. Upon detecting the start of a touch at 415, then the touch stage enters an entry state 420. In the entry state 420, a touch is anticipated but has not occurred yet. This may occur for example, during a "pinch down," where two fingers are moving toward each other, or another movement in which to portions of the hand are moving towards each other. The movement may be detected, for example, based on a pose of the hand over a set of frames, such as comparing the current hose of a hand in a current frame to a prior pose of the hand in a prior frame. Additionally, or alternatively, the start of the touch may be detected using machine learning models, as will be described below with respect to FIG. 5.

The entry state 420 may occur over a single frame for several frames. Following the entry state 420, a touch may be determined either to the occurring, as shown at 425, or may be determined to no longer be occurring, as shown where the detected touch is stopped at 455. A sustained touch may be detected as shown at 425, when a touch is determined to be occurring for a particular frame. This causes the touch stage to enter the hold stage 430. In the hold stage, a touch is currently occurring. That is, two regions of the hand may be determined to be in contact. For example, an index finger and a thumb may be determined to be touching in a pinch fashion.

Returning to the entry state 420, if a subsequent frame indicates that the touch is no longer detected, as shown at stop entry detected 455, then the touch stage enters the exit stage 440. In the exit stage 440, the touch is no longer detected. This may occur, for example, if the determination that the touch was being initiated, in the entry state 420, was incorrect. For example, a user may have initiated movement of two fingers towards each other but never actually touched the two fingers together. For example, the touch stage may exit the entry state 420 after a timeout period, or a predetermined number of frames, in which the sustained touch is not detected.

In the situation when the touch stage entered the hold stage 430, then the hold stage 430 occurs while the touch is occurring. For example, the touch stage may be held for each frame for which two portions of the hand are determined to be in contact. This may occur, for example, if a pinch is performed very slowly such that the contact takes place over multiple frames, or if a pinch is held, for example during a dragging motion, or the like. Upon detecting, for a subsequent frame, that the two portions of the hand are no longer in contact, then the touch stage may no longer be detected, as shown by stop touch detected 435. Accordingly, the touch stage enters the exit stage 440. The exit stage 440 may indicate, as described above, that the touch never actually occurred, or upon entering the exit stage 440 from the hold stage 430, that the touch is ending. This may occur, for example, when to portions of the hand previously in contact move away from each other, for example in a "pinch up."

From the exit stage 440, the flow 400 may continue to either an idle stage 410, if no entry is detected for one or more subsequent frames 445. Alternatively, from the exit stage 440, a start touch may be detected as shown at 450, and the touch stage may reenter the entry state 420. This may occur, for example, when a user proceeds from a pinch up to a pinch down quickly, and the like. The flow 400 may continue while frames of hand tracking data are received.

Figure 5:
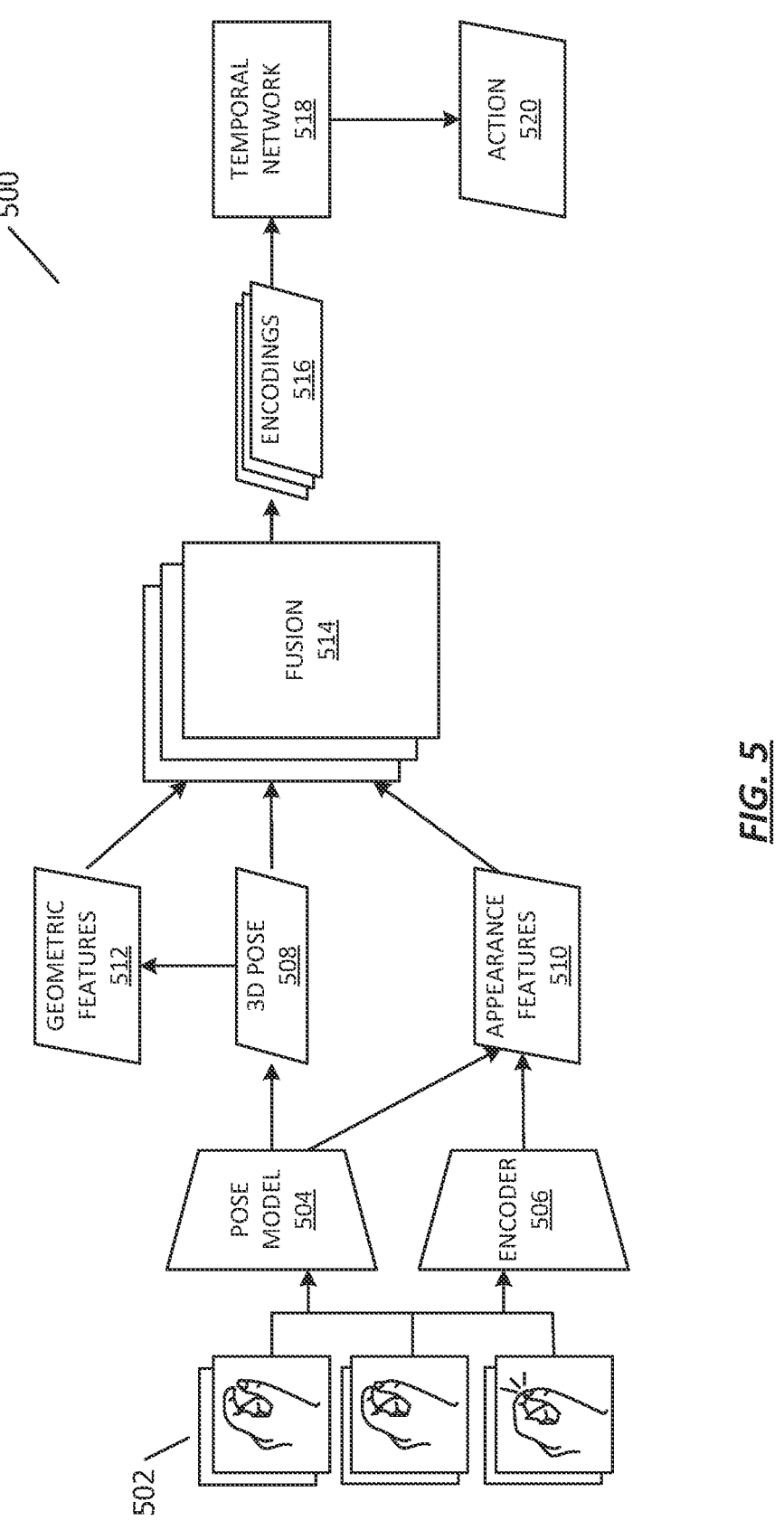
FIG. 5 shows a flow diagram of an action network, in accordance with some embodiments.

A touch signal indicating a touch event is occurring for a frame, can be determined in a number of ways. For example, in some embodiments, heuristics can be used based on the hand tracking data to determine whether a touch has occurred, and/or a current touch stage. FIG. 5 shows a flow diagram of an action network, in accordance with some embodiments, which provides an example machine learning process for determining whether a touch has occurred.

The pipeline 500 begins with a set of frames 502 as input. The frames 502 may be a temporal series of image frames of a hand captured by one or more cameras. The cameras may be individual cameras, stereo cameras, cameras for which the camera exposures have been synchronized, or a combination thereof. The cameras may be situated on a user's electronic device, such as a mobile device or a head mounted device. The frames may include a series of one or more frames associated with a predetermined time. For example, the frames 502 may include a series of individual frames captured at consecutive times, and/or can include multiple frames captured at each of the consecutive times. The entirety of the frames may represent a motion sequence of a hand from which a touch may be detected or not for any particular time.

The frames 502 may be applied to a pose model 504. The pose model 504 may be a trained neural network configured to predict a 3D pose 508 of a hand based on a given frame (or set of frames, for example in the case of a stereoscopic camera) for a given time. That is, each frame of frame set 502 may be applied to pose model 504 to generate a 3D pose 508. As such, the pose model can predict the pose of a hand at a particular point in time. In some embodiments, geometric features 512 may be derived from the 3D pose 508. The geometric features may indicate, relational features among the joints of the hand, which may be identified by the 3D pose. That is, in some embodiments, the 3D pose 508 may indicate a position and location of joints in the hand, whereas the geometric features 512 may indicate the spatial relationship between the joints. As an example, the geometric features 512 may indicate a distance between two joints, etc.

In some embodiments, the frames 502 may additionally be applied to an encoder 506, which is trained to generate latent values for a given input frame (or frames) from a particular time indicative of an appearance of the hand. The appearance features 510 may be features which can be identifiable from the frames 502, but not particularly useful for pose. As such, these appearance features may be overlooked by the pose model 504, but may be useful within the pipeline 500 to determine whether a touch occurs. For example, the appearance features 510 may be complementary features to the geometric features 512 or 3D pose 508 to further the goal of determining a particular action 520, such as whether a touch has occurred. According to some embodiments, the encoder 506 may be part of a network that is related to the pose model 504, such that the encoder may use some of the pose data for predicting appearance features. Further, in some embodiments, the 3D pose 508 and the appearance features 510 may be predicted by a single model, or two separate, unrelated models. The result of the encoder 506 may be a set of appearance features 510, for example, in the form of a set of latents.

A fusion network 514 is configured to receive as input, the geometric features 512, 3D pose 508, and appearance features 510, and generate, per time, a set of encodings 516. The fusion network 514 may combine the geometric features 512, 3D pose 508, and appearance features 510 in any number of ways. For example, the various features can be weighted in the combination in different ways or otherwise combined in different ways to obtain a set of encodings 516 per time.

The encodings are then run through a temporal network 518, to determine an action 520 per time. The action 520 may indicate, for example, whether a touch, or change in touch stage has occurred or not. The temporal network 518 may consider both a frame (or set of frames) for a particular time for which the action 520 is determined, as well as other frame in the frame set 502.

Figure 6:
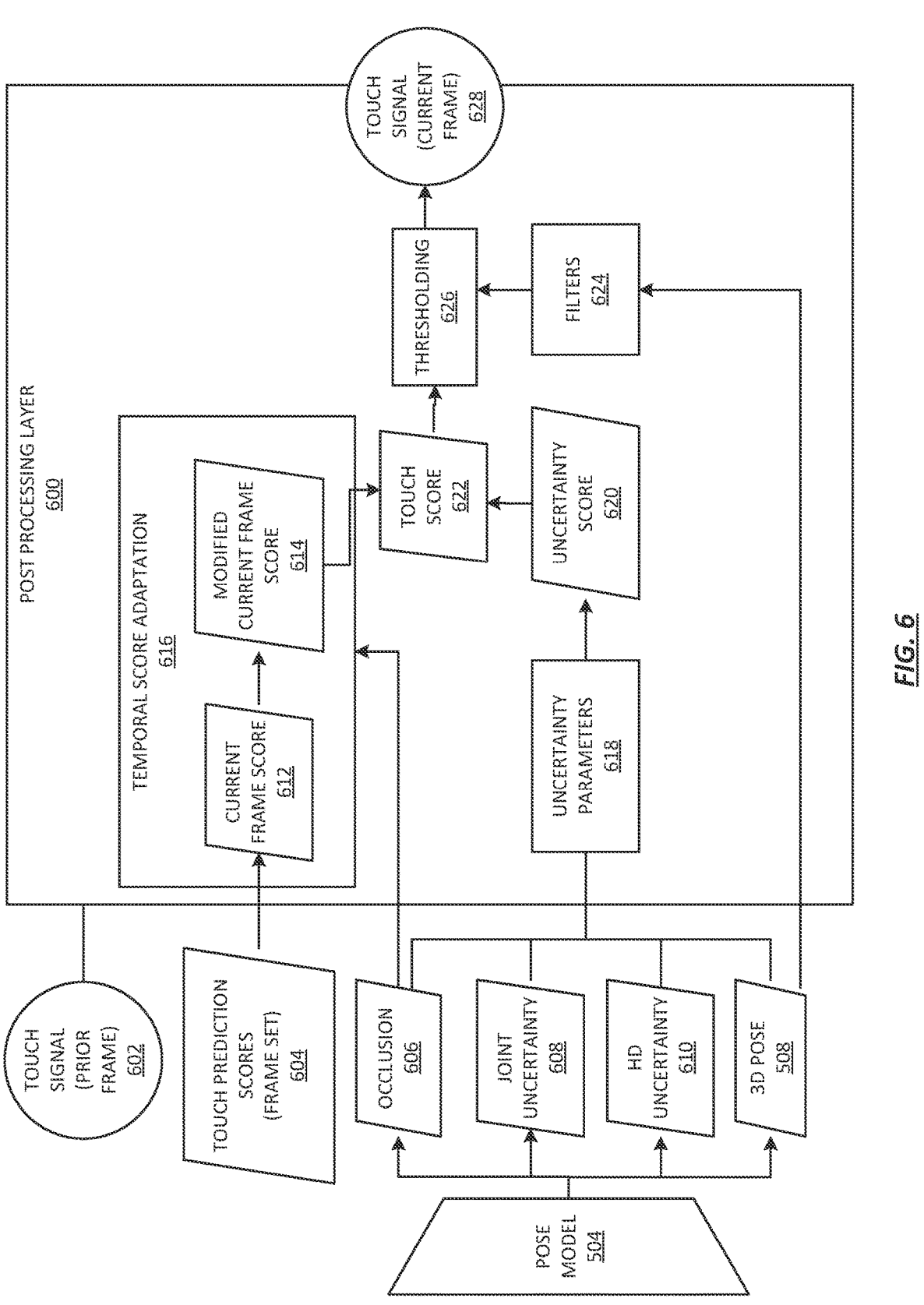
FIG. 6 shows, a flow diagram for handling occluded hands for gesture recognition, according to some embodiments.

According to one or more embodiments, the action signal 520 may be further refined in a post processing step. FIG. 6, shows a flow diagram for handling occluded hands for gesture recognition, according to some embodiments.

Although the various components of the flow diagram are presented in a particular configuration, it should be understood that in some embodiments, the various components and functionality may be differently arranged.

Initially, a touch signal is received for a prior frame 602. The touch signal may be determined, for example, based on data from the hand tracking network. In some embodiments, the touch signal may be obtained from the pipeline 500 described above with respect to FIG. 5, and/or from a frame previously processed by the framework described herein with respect to FIG. 6. The touch signal may indicate a touch or no touch state.

A touch prediction score is obtained for each set of frames (or each set of synced frames), for example frame set 502. The touch prediction scores 604 for the frame set may include a current frame score 612, as well as prior frame scores, for example during previous iterations of the post processing in the post processing layer 600 for the frame set. The frame score may be based on a network trained to predict whether a touch occurs at a given time based on the image data for that time. The frame score may be generated in the form of a value which may indicate a likelihood of a touch for that frame.

The post processing layer 600, may also take as input, outputs from the pose model 504. As described above with respect to FIG. 5, the pose model may generate 3D pose data 508 for a given time. In some embodiments, the pose model 504 may generate additional outputs, such as occlusion score 606, joint uncertainty score 608, and hover distance uncertainty score 610.

The occlusion score 606, indicates the probability per joint (and per view, when multiple frames capture a hand for a single time) that the particular joint is occluded. Occlusion refers to the ability to make inferences, regarding the action of the hand from the given images. In some embodiments, the occlusion score 606 may be represented in other ways, such as a percentage of the hand that is occluded, or the like. The joint uncertainty score 608 includes a value that refers to how certain the prediction is for a particular joint. The hover distance uncertainty score indicates a certainty of a hover distance prediction by the pose model 504, such as the distance between two portions of the hand. The hover distance uncertainty score 610, may be a single score or multiple scores per hand. That is, the hover distance may be determined per joint or per hand, or for a subset of joints of the hand. The 3D pose 508, indicates a 3D location for a particular joint and may be determined on a per-joint basis.

The post processing layer 600 includes a temporal score adaptation 616. The temporal score adaptation 616 may take the current frame score 612, along with the prior frame scores from the touch prediction scores 604, and the occlusion scores 606 to generate a modified current frame score 612. The current frame score 612, may be based on a single frame, or on a set of frames. According to one or more embodiments, the temporal score adaptation 616 modifies a particular frame score based on occlusion such that changes in the score are dampened in response to occlusion. The temporal score adaptation 616 may consider the occlusion scores 606 for all the joints, or for a subset of joints, such as the pertinent joints for a given gesture. As an example, to detect a pinch, the tips of the index finger and thumbs may be considered, but other joints may be disregarded. According to one or more embodiments, consideration of occlusion scores temporally because movement may be considered.

According to one or more embodiments, the current frame score 612 may be associated with a value within a range that has thresholds indicating a "make" or "break" for a pinch. A make threshold may be satisfied by a substantially high value, whereas a break threshold may be satisfied by a substantially low value. The thresholding values may be predetermined. The occlusion score may cause the current frame score 612 to be increased or reduced to a modified current frame score 614. The result will be that it is more difficult to change touch state when a hand is occluded.

Before the modified current frame score 614 is thresholded, the post processing layer 600 may consider other uncertainty values. For example, other uncertainty parameters 618 may be determined. These may include uncertainty parameters for a particular gesture, determined using the various scores or combinations of the scores. For example, in detecting a touch between an index finger and a thumb, the uncertainty parameters may include a pinch occlusion score, a pinch joint uncertainty score, a pinch hover distance uncertainty score (for example, based on the 3D pose 508 and hover distance uncertainty 610), hover distance unsure score (for example, based on pose), or a "make" unsure score (for example, based on temporal score adaptation). The combination of the uncertainty parameters 618 may be used to generate an uncertainty score 620. The uncertainty score may indicate whether to apply a filter to the modified current frame score 614 to obtain a touch score 622. The touch score 622 may then be thresholded at 626. In some embodiments, additional filters 624 may be applied based on 3D pose, for example a given rotation of the hand. Based on the comparison of the touch score 622 to the thresholding values 626, a final touch signal 628 can be determined. The touch signal may indicate a change in touch stage, such as a "make" when contact occurs, or a "break" when contact ends.

Figure 7B:
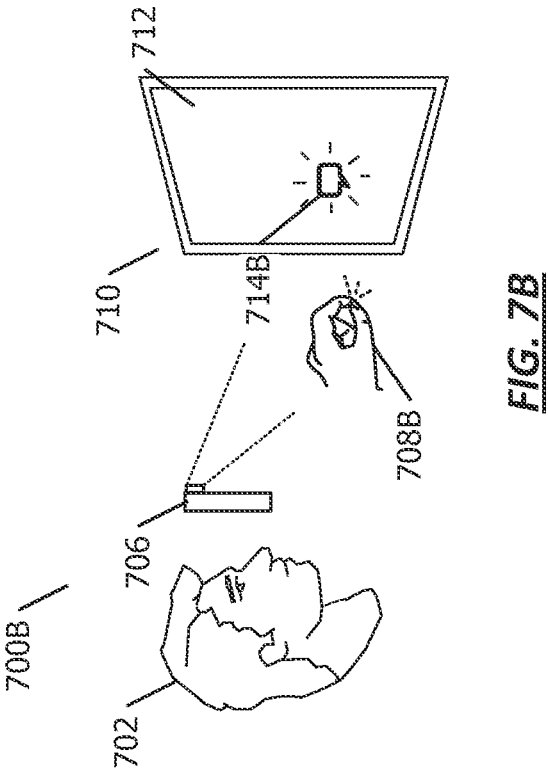
FIGS. 7A-7B show example diagrams of a technique for processing an occluded gesture, in accordance with one or more embodiments.
Figure 7A:
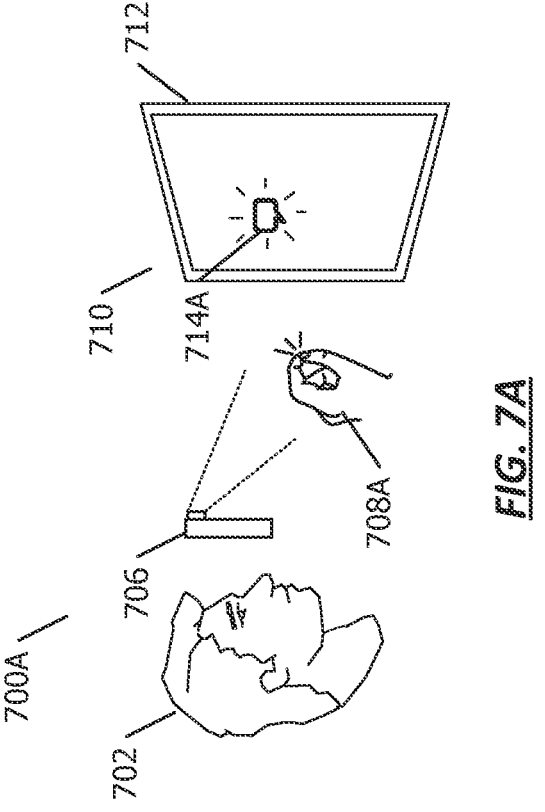

FIGS. 7A-B show an example system setup in which a hand gesture is occluded. In particular, FIGS. 7A-B, show a system setup for a user interacting with a device, in accordance with some embodiments. It should be understood that the various features and description of FIGS. 7A-B, are provided for illustrative purposes and are not necessarily intended to limit the scope of the disclosure.

In FIG. 7A, a system setup 700A is provided in which a user 702 is viewing a display device 706, which is used to interact with virtual content 710. The virtual content 710 is depicted as being separate from the device 706 and situated in front of the user 702. However, it should be understood that the virtual content 710 may actually be displayed by the device 706 and would not be physically separate from the device 706 in the physical environment. The virtual content 710, includes a display region on which a selectable component 714A is displayed. In system setup 700A, the user 702 is using their hand 708A to perform an input gesture, which causes the selectable component 714A to be selected. For example, the input component 714A may be selected such that the user can drag it around the display region 712. In the system setup 700A, the hand 708A is posed in such a manner that the gesture is un-occluded. That is, enough of the hand 708A is visible so as to make a determination that the pinch gesture is occurring. For example, as described above with respect to FIGS. 5-6, the hand tracking data collected by hand tracking sensors on device 706, may collect sufficient data to determine that the hand 708 is performing a pinch gesture.

By contrast, as shown at FIG. 7B, a system setup 700B is provided in which the user 702 is viewing the display device 706. However, in this figure, the hand of the user 708B is positioned such that hand tracking data captured by device 706 may not collect sufficient data to determine whether the pinch is occurring. According to one or more embodiments, if a gesture becomes occluded such that the device 706 is unable to decide as to whether or not the gesture is occurring, then the last determined gesture state may be used for the frame that has the occlusion. As an example, the frame captured in FIG. 7A, may indicate that a pinch is occurring. When the hand 708B becomes occluded at FIG. 7B, then the last gesture state immediately before the occlusion of hand 708B may be used. For instance, if the hand 708A was determined to be performing a pinch immediately before the index finger and thumb were occluded at the position of the hand 708B, then the hand 708B may be considered to be performing a pinch regardless of whether the hand 708B is actually performing a pinch while the joints are occluded. Conversely, if the hand 708A was determined to be not performing a pinch immediately before the index finger and thumb were occluded at the position of the hand 708B, then the hand 708B may be considered not to be performing a pinch regardless of whether the hand 708B is actually performing a pinch while the joints are occluded.

According to one or more embodiments, when one or more joints of the hand are occluded, the configuration of the joints is "locked" from a prior frame in which the joints were not occluded. In this manner, when hand joints are occluded, or substantially occluded such that a threshold level of occlusion is satisfied, a touch stage from a prior frame will be used for the current frame. As such, in some embodiments, an occluded hand may not result in a change in determined pinch stage.

Holding a prior determined gesture state may be based on a heuristic technique. For example, returning to FIG. 1, if data from the hand tracking network 104 indicates that the hand is sufficiently occluded, such that no determination is made as to whether a gesture is occurring, then the hand tracking network 104 may utilize a previous-determined touch signal 108 for a prior frame. In another example, as described above with respect to FIGS. 5-6, one manner in which the gesture state can be held, particularly with respect to touch-based gestures, is held by modifying a touch signal for the occluded frame such that the touch signal fails to satisfy a break threshold indicating that the touch is no longer occurring. As shown here in FIG. 7B, the joints of the hand 708B are occluded from the perspective of the device 706, but the input component 714B continues to be dragged along the display region 712 of the virtual content 710.

Figure 8:
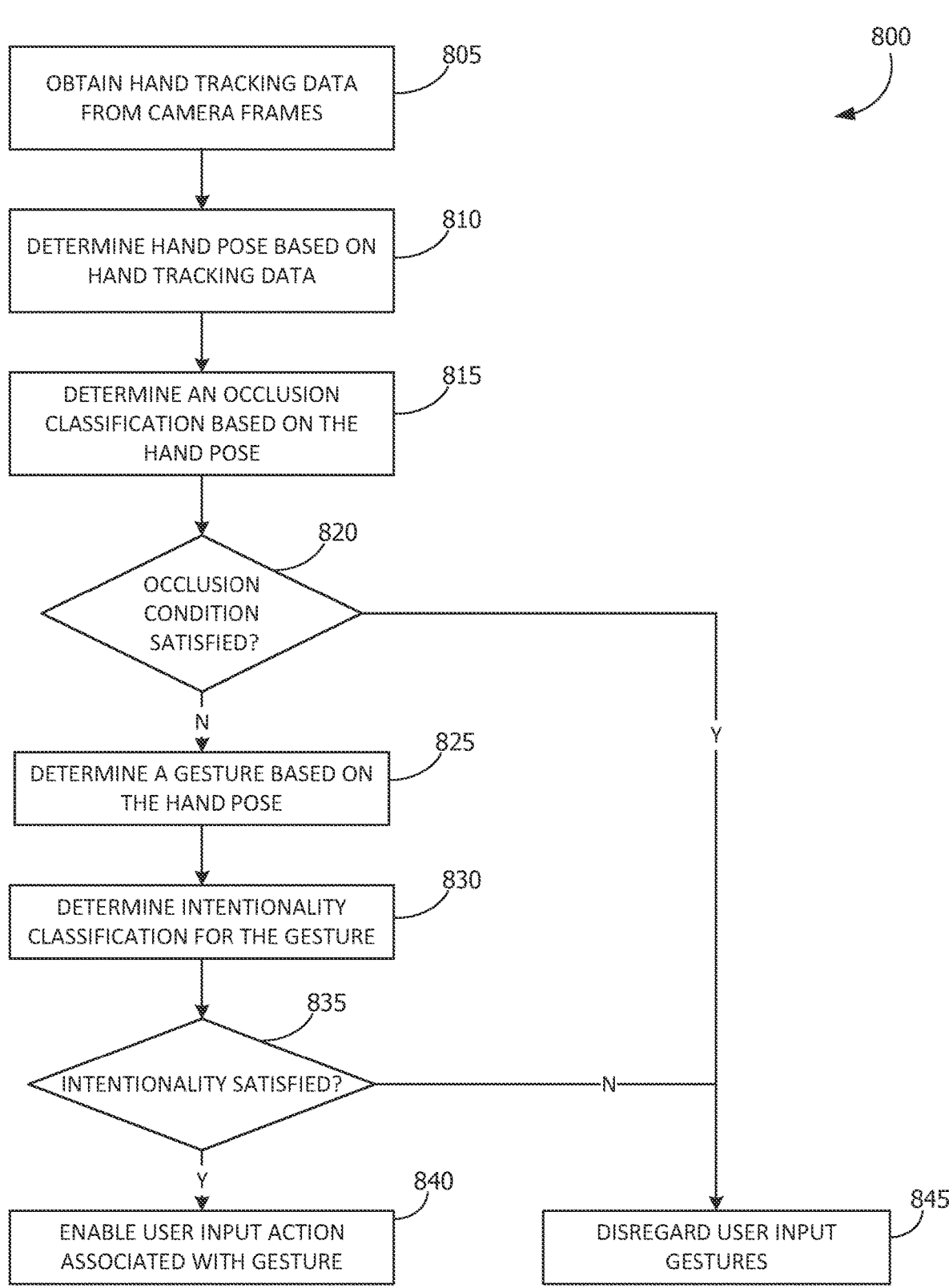
FIG. 8 shows a flowchart of a technique for handling occluded hands for gesture recognition, according to some embodiments.

FIG. 8 depicts a flowchart of a technique for processing gesture input while considering the level of occlusion. For purposes of explanation, the following steps will be described as being performed by particular components. However, it should be understood that the various actions may be performed by alternate components. In addition, the various actions may be performed in a different order. Further, some actions may be performed simultaneously, and some may not be required, or others may be added.

The flowchart 800 begins at block 805, where hand tracking data is obtained from camera frames. The hand tracking data may include, for example, image data, depth data, etc. In some embodiments, the hand tracking data may include or be based on sensors data, such as image data and/or depth data captured of a user's hand or hands. In some embodiments, the sensor data may be captured from sensors on an electronic device, such as outward facing cameras on a head mounted device, or cameras otherwise configured in an electronic device to capture sensor data including a user's hands. In some embodiments, the sensor data 102 may include additional data collected by an electronic device and related to the user. For example, the sensor data may provide location data for the electronic device, such as position and orientation of the device.

At block 810, a hand pose is determined based on the hand tracking data. According to one or more embodiments, the hand pose data may include location information for each of the set of joints of the hand. From the locations of the joints of the hand, pose information about the hand can be inferred.

The flowchart 800 continues to block 815, where an occlusion classification is determined based on the hand pose. The occlusion classification may include, for example, an occlusion score as described above with respect to FIG. 6. Alternatively, the occlusion classification may indicate a level of occlusion, or whether the occlusion rises to a substantial level that a determination cannot be made as to whether a user is performing a gesture. The occlusion classification may be based on an occlusion score for each of the set of joints from the hand tracking data, a subset of the joints of the hand tracking data (for example, the joints used for a particular gesture), or may be determined more holistically. For example, a percentage of joints determined to be substantially included may indicate that the hand satisfies an occlusion condition. Similarly, a percentage of a 3D representation of the hand, such as a mesh representation, may indicate that an occlusion condition is satisfied.

A determination is made at block 820 as to whether the occlusion condition is satisfied. If the occlusion condition is satisfied, then the gesture is disregarded for the user input, as shown at block 845. In some embodiments, as described above, disregarding the gesture for user input, may also include utilizing a prior determined touch signal for the hand. Moreover, in some embodiments, disregarding user input gesture at block 845 may include modifying a touch score for a particular frame such that make-or-break thresholding will not be satisfied, as described above with respect to FIG. 6. The flowchart 800 may then be repeated for a subsequent frame or frames of hand tracking data.

Returning to block 820, if the occlusion condition is not satisfied, then the flowchart continues to block 825. For example, the occlusion condition may not be satisfied when the hand is not substantially occluded, such that the gesture can't be determined with a threshold level of confidence. This may occur, for example, based on a threshold percentage of joints (or pertinent joints for a gesture) of the hand, threshold portion of the hand, or the like is not occluded. At block 825, a gesture is determined based on hand pose. According to some embodiments, a gesture may indicate a user input gesture which is associated with an input action. A pose performed by a hand can match the gesture. In addition, the hand may be partially occluded while still not satisfy the occlusion condition.

At block 830, and intentionality classification is determined for the gesture. As described above with respect to FIG. 1, a gesture determination framework 110 can make a determination as to whether the gesture was performed by a user with the intent of performing the user input action or was unintentional. For purposes of this description, unintentional means the user did not intend for the gesture to lead to a user input action. As such, the user may intend to perform the pose for another reason, such as scratching an arm, using a physical input device, without intending to generate gesture-based user input. In some embodiments, the intentionality classification may be determined based on the hand tracking data, as well as other data, such as eye tracking data, user interface geometry, events generated by connected peripherals, and the like.

The flowchart continues to block 835, where a determination is made as to whether intentionality classification satisfied. In some embodiments, the intentionality classification may include will be based on a is intentionality score, which may be compared as a predetermined threshold of intentionality. This may indicate a sufficient level of confidence that the gesture was performed with intent to generate a user input action.

If the intentionality is classification is not satisfied, the flowchart concludes at block 845, and the user input gesture is disregarded. The user input gesture can be disregarded by either transmitting a gesture signal that indicates no gesture is being performed. In some embodiments, if the user input gesture is disregarded, a cancellation signal may be transmitted to cancel a is gesture signal determined from a prior frame for the gesture. This may occur, for example, when a determination for a prior frame indicated that intentional user input gesture, but upon receiving further frames, a determination is made that the input gesture is unintentional. For example, additional data received may change the determination. Disregarding the input gesture at block 825 using a cancellation signal, may cause gesture processing to action differently than if the signal was simply transmitted as no gesture received. For example, an input action associated with the gesture may be presented to the user to indicate that the gesture was recognized, but an action associated with the gesture may not be deployed.

By contrast, returning to block 835, if the intentionality condition is satisfied, the flowchart concludes to block 840 and the user input action is enabled. The user input action may be the particular input action associated with the gesture and/or other contextual information, such as available user interface components, gaze information, peripheral availability, and the like.

According to some embodiments, input gestures may be processed even during an occluded frame. In particular, returning to the example of FIG. 7, if a user 702 were to release a pinch while the hand 708 was occluded, it may be beneficial to process that a release of the pinch occurs even when the pinch is occluded. In some embodiments, this may occur for such gestures as scrolls, swipes, drags, or the like. If the release is not processed during occlusion, then the result would be a "hooking" effect where the UI input continues to occur after the user has released a pinch. Further, some of these gestures may require differing levels of preciseness. For example, a scroll may be less sensitive to a velocity of the hand at the time the pinch is released than a drag. Thus, techniques described herein can determine during occlusion whether to exit a touch state under certain circumstances.

Figure 9A:
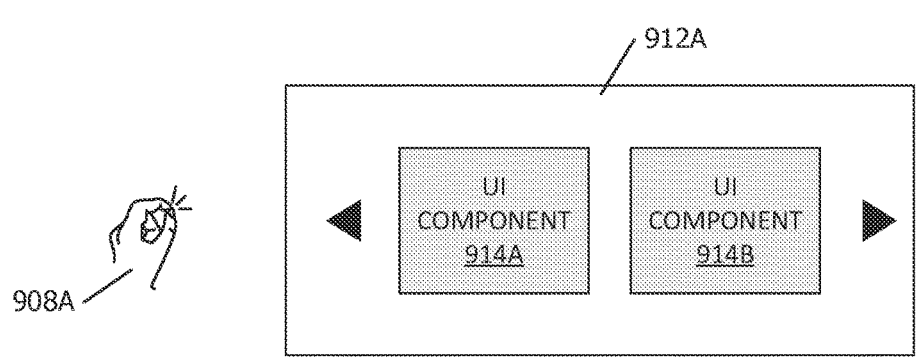
FIGS. 9A-9C show example diagrams of an alternative technique for processing an occluded gesture, in accordance with one or more embodiments.
Figure 9B:
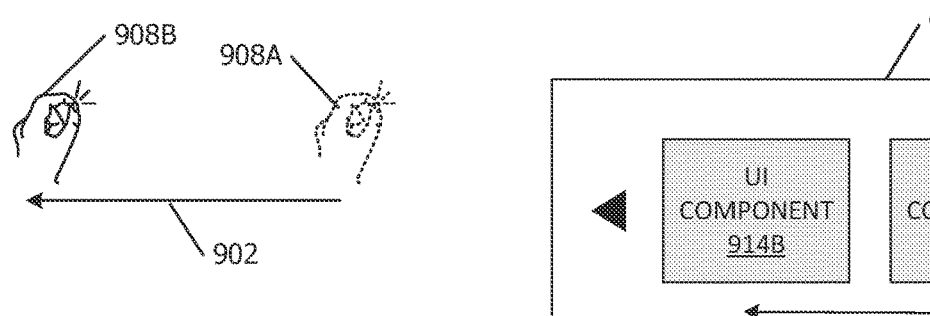
Figure 9C:
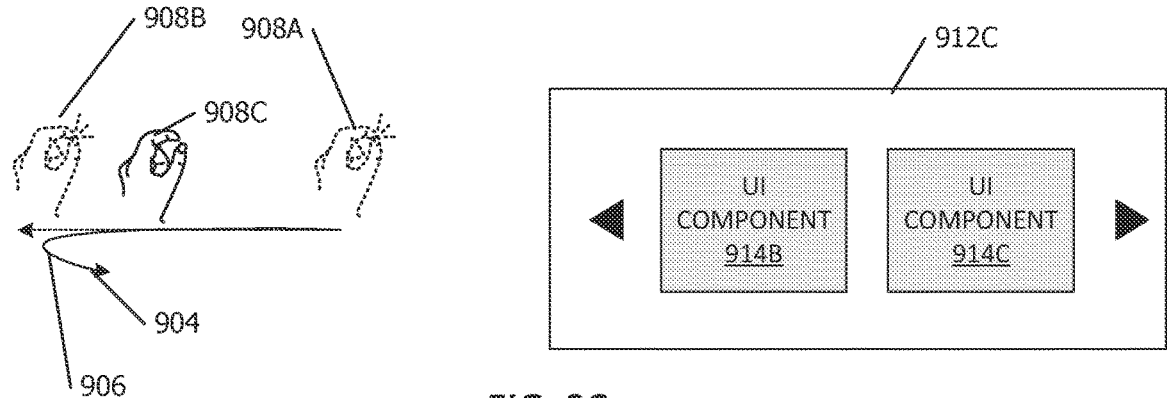

FIGS. 9A-9C depict an example of a user performing a momentum-sensitive gesture, such as a scroll. For purposes of the example diagrams, the hand is clearly shown. However, it should be understood that according to one embodiment, the flow diagram may occur as at least part of the hand is occluded, such as the fingertips. Further, FIGS. 9A-9C are merely presented as an example and are not intended limit the invention.

In FIG. 9A, a pose is detected. In particular, the pose of the hand 908A may be identified with a particular gesture, such as a scroll. Although a single point in time is shown in FIG. 9A, it should be understood that the determination that the pose is a drag may be based on temporal data over a series of frames. For example, a scroll may be detected based on a particular pose in addition to movement of that pose, such as a pinch and movement of the hand. In this example, the hand 908A begins in a first pose in association with input for user interface 912. User interface 912A may include one or more UI components, such as UI component

914A and UI component 914B which are presented on a display. In some embodiments, the user interface 912A may be presented on a physical display, and/or may be presented on a user interface plane in a virtual manner, such as in an XR experience.

FIG. 9B shows an example trajectory 902 of the hand 908. Here, updated position of the hand 908B is shown as having moved along a trajectory 902 from the prior position of the hand 908A. The user input gesture is thus translated into a user input action, and the user interface 912B is similarly scrolled. As such, the user interface 912B now shows UI component 914B and UI component 914C.

FIG. 9C shows an example where the user has begun moving their hand in the opposite direction. As shown, hand 908C is depicted as having changed directions in accordance with trajectory 904, and is now shown between the original hand location 908A and the prior hand location 908B. However, in FIG. 3, the release of the pinch is detected. Thus, the user input gesture is not translated into the user input action, and the user interface 912C remains stationary from user interface 912B. As such, the user interface 912B continues to show UI component 914B and UI component 914C. However, in some embodiments, the velocity prior to the change in momentum may affect the user input (such as at peak velocity, at a velocity prior to a change in direction, or the like). For example, the user input may continue moving in accordance with the momentum prior to the change in direction at 906.

In some embodiments, the beginning and ending of the scroll may be based on a detected contact make event (such as a pinch down), movement, and contact break event (such as a "pinch up," or release of the pinch). However, in some scenarios, the fingertips or regions of the hand performing the contact may be obscured or otherwise occluded. For example, the release of the pinch showed at 908C may not be clearly visible or distinguishable from the hand tracking data. In these scenarios, additional contextual data can be used to determine whether a break event should be used to generate a predicted break event, rather than disregarding the user input gesture, as described above with respect to block 845 of FIG. 8.

Figure 10:
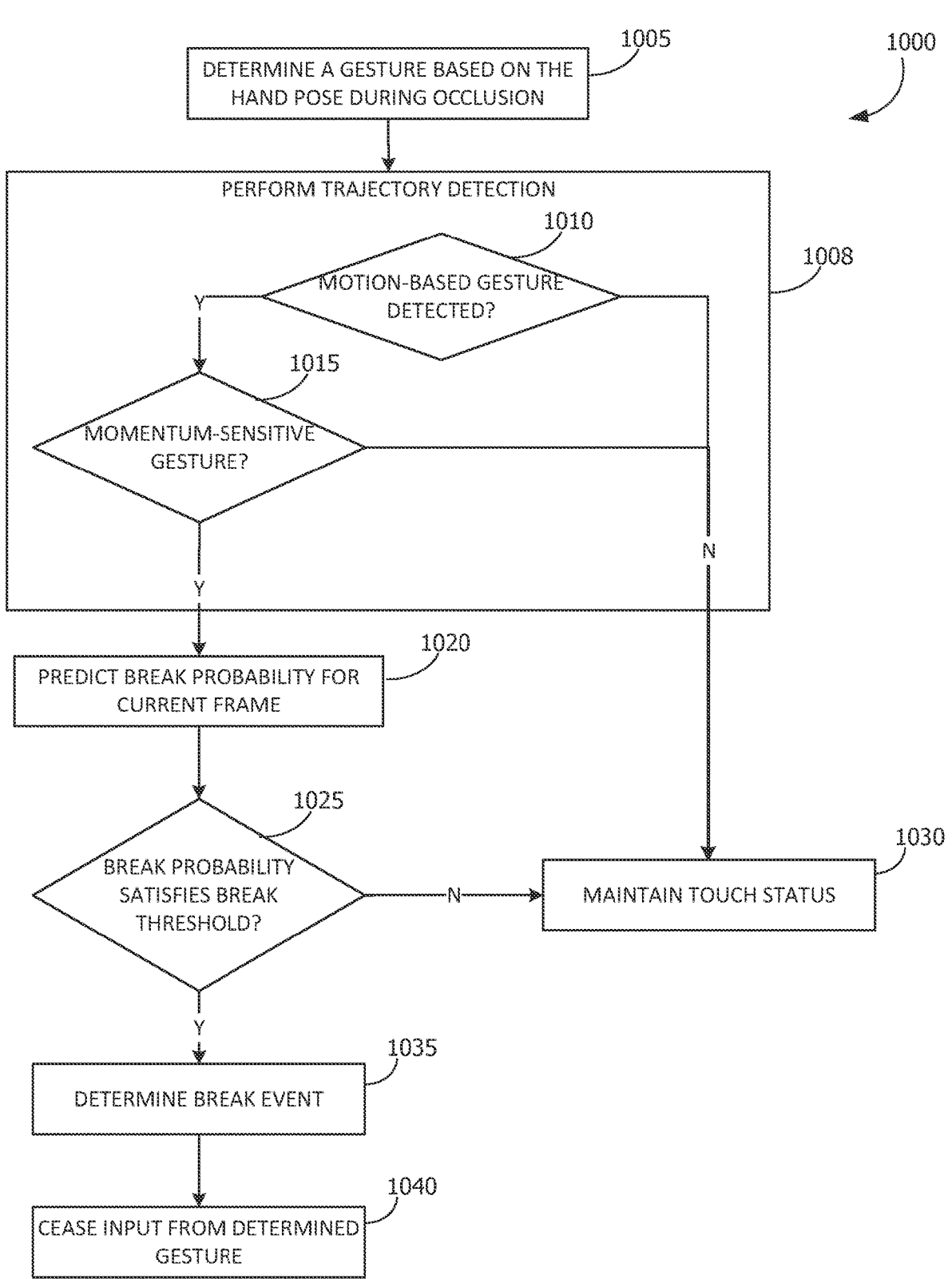
FIG. 10 shows a flowchart of a technique for handling occluded hands for gesture recognition for particular gestures, according to some embodiments.

FIG. 10 depicts a flowchart of a technique for processing gesture input during occlusion. For purposes of explanation, the following steps will be described as being performed by particular components and in the context of FIG. 8. However, it should be understood that the various actions may be performed by alternate components. In addition, the various actions may be performed in a different order. Further, some actions may be performed simultaneously, and some may not be required, or others may be added.

The flowchart 1000 begins at block 1005, where a gesture is determined based on hand pose. According to some embodiments, a gesture may indicate a user input gesture which is associated with an input action. A pose performed by a hand can match the gesture. As described above with respect to FIG. 8, determining the gesture may include collecting hand tracking data and/or other sensor data, and determine a hand pose. For purposes of the flowchart 1000, the gesture is determined in an occluded state. For example, the hand pose may be associated with an occlusion classification based on an occlusion score for each of the set of joints from the hand tracking data, a subset of the joints of the hand tracking data, or may be determined more holistically.

The flowchart 1000 continues to block 1008, where trajectory detection is performed. Trajectory detection may include analyzing the movement of the hand to determine intentionality of the characteristics of the gesture. In general, trajectory detection may be used to determine whether to predict a change in contact status occurs while a hand is occluded. Thus, in some embodiments, the trajectory detection performed at block 1008 provides an override to the technique described in FIG. 8, where occluded poses are disregarded with respect to a change in contact status. In some embodiments, trajectory detection may include a two-step decision framework, as shown here. However, it should be understood that the decisions made in block 1010 and 1015 may be determined concurrently. For example, separate networks or sets of heuristics (or a combination thereof) may be used for the determination at blocks 1010 and 1015. Alternatively, the determinations may be made by a single network or set of heuristics. For purposes of clarity, the determinations are described herein as separate determinations.

At block 1010, a determination is made as to whether the gesture is a motion-based gesture. These gestures may be characterized by input that involves a pinch or other hand pose activating the gesture, wherein the movement of the hand while the hand pose is performed is used for generating user input. Examples include scrolling an interface or components of an interface, dragging an interface component, swiping, or the like. In some embodiments, the motion-based gesture may use hand tracking data and/or gaze data to determine the intent of the user for generating user input, as described above. In some embodiments, motion-based gestures may differ from non-motion based gestures (for example, a selection using a pinch and gaze information) because motion-based gestures involve translating the motion of the hand or portion of a hand (such as a pinch location) to user input. By contrast, non-motion based gestures do not translate the motion of the and to user input either by not detecting motion, or by disregarding any motion detected as unintentional. Thus, a motion-based gesture can be defined by a contact make event (such as a pinch down), movement of the hand, and a contact break event (such as a "pinch up," or release of a pinch).

If a determination is made that the gesture is a motion-based gesture, then the flowchart 1000 continues to block 1015 and a determination is made as to whether the motion-based gesture is a momentum-sensitive gesture. According to one or more embodiments, some motion-based gestures are more sensitive to momentum than others. That is, the velocity of the motion of the hand at the end of the gesture may be used to drive the user input. In some embodiments, the momentum sensitive gesture may be associated with contact break event that correlates to a change in momentum. As an example, a user performing a drag gesture may be a user moving a virtual component from one location to another in an environment, such as on a virtual display plane presented in a physical environment, as shown in FIG. 7. In this instance, the user is unlikely to intend for the pinch to be released based on a change in velocity because the user is trying to place the UI component in a particular position. By contrast, a user performing a scroll or swipe may intend for the break event to occur when momentum changes.

Whether a gesture is a momentum-sensitive gesture may be determined based on additional context besides hand tracking data. For example, the system may consider UI content currently presented. If the currently presented UI provides an opportunity to scroll and not an opportunity to drag, then a momentum-sensitive gesture is more likely to occur (because the scroll is considered a momentum-sensitive gesture in this scenario). As another example, if a prior-detected gesture was a momentum-sensitive gesture, of the momentum-sensitive gesture has been detected in a repeated manner, then the momentum-sensitive gesture is more likely to occur. In some embodiments, gaze detection may additionally be used to determine whether the gesture is a momentum-sensitive gesture. For example, if gaze target that is captured concurrently with the gesture remains stable, then the gesture may be determined to be a momentum-sensitive gesture, whereas if the gaze target tracks the motion on the user interface, then the gesture may not be considered to be a momentum sensitive gesture. In this scenario, the gaze data captured concurrently with the gesture may be compared against a stability criterion, for example to determine that a target of the gaze remains within a predefined distance on the user interface during the gesture. As such, the stability criterion may include a gaze stability classification.

If the gesture is determined to be a momentum-sensitive gesture at block 1015, then the flowchart 1000 proceeds to block 1020 and a break probability is predicted for the current frame. A break probability indicates a likelihood that a user intends to break contact in a given frame. The break probability may be predicted, for example, by a break module which may include a network trained to predict whether a break event occurs at a frame, or the likelihood of a break event occurring. That is, the break module is configured to predict whether the contact that was used for the gesture has broken in a given frame. For example, the network may take data such as occlusion data 606 from FIG. 6, action 520 from FIG. 5, hand pose 106 from FIG. 1, and the like, to predict an intent to perform a break event.

In some embodiments, the break module provides a binary output as to whether a break is predicted. Alternatively, the break module may provide an output indicative of a likelihood that a break event occurs for a given frame in the form of a break probability. Accordingly, if the break probability is provided, then the flowchart proceeds to block 1025 and a determination is made as to whether the break probability satisfies a break threshold. The break threshold may be predetermined probability at which the system determines the break should occur. The break probability threshold may be a predefined value, for example by a system or application, or may be user-defined.

If the break probability satisfies the break threshold at block 1025, then the flowchart 1000 proceeds to block 1035. At block 1035 a break event is determined. The break event may indicate that a contact signal transitions to no contact. The flowchart 1000 concludes at block 1040, and input is ceased from the determined gesture. Accordingly, even though the hand is still moving, that movement is not translated into a user input action. Rather, the initiation of a subsequent gesture is detected prior to the movement being used to drive user input.

Returning to block 1010, if the detected gesture is not a motion-based gesture, then the flowchart concludes at block 1030 and the current touch status is maintained for the current frame of hand tracking data. In some embodiments, the determination may be made based on the gesture determination framework 110 of FIG. 1, or the like. Similarly, if a determination is made at block 1015, that the motion-based gesture is not a momentum-sensitive gesture, the flowchart concludes at block 1030. In some embodiments, if the trajectory detection indicates that the gesture is not a motion-based gesture, or the motion-based gesture is not a momentum-sensitive gesture, then the touch status is determined as described above with respect to FIG. 8, and/or as using the technique described above with respect to FIG. 6. In some embodiments, if the user input gesture is disregarded, a cancellation signal may be transmitted to cancel a is gesture signal determined from a prior frame for the gesture. This may occur, for example, when a determination for a prior frame indicated that a detected gesture was momentum-sensitive, but upon receiving further frames, a determination is made that the input gesture is not intended to be momentum-sensitive.

Figure 11:
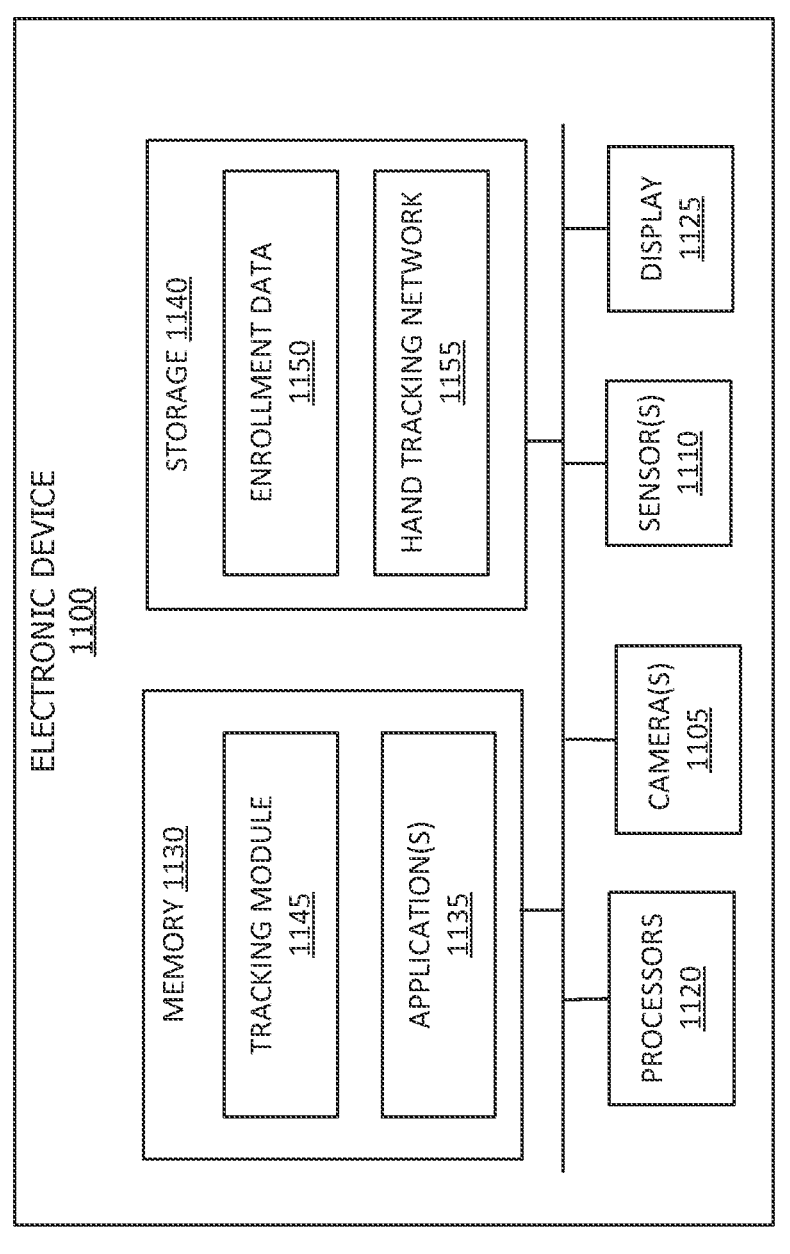
FIG. 11 shows a system diagram of an electronic device which can be used for gesture recognition, in accordance with one or more embodiments.

Referring to FIG. 11, a simplified block diagram of an electronic device 1100 is depicted. Electronic device 1100 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 1100 may include one or more additional devices within which the various functionality may be contained or across which the various functionality may be distributed, such as server devices, base stations, accessory devices, etc. Illustrative networks include, but are not limited to, a local network such as a universal serial bus (USB) network, an organization's local area network, and a wide area network such as the Internet. According to one or more embodiments, electronic device 1100 is utilized to interact with a user interface of an application 1135. It should be understood that the various components and functionality within electronic device 1100 may be differently distributed across the modules or components, or even across additional devices.

Electronic Device 1100 may include one or more processors 1120, such as a central processing unit (CPU) or graphics processing unit (GPU). Electronic device 1100 may also include a memory 1130. Memory 1130 may include one or more different types of memory, which may be used for performing device functions in conjunction with processor(s) 1120. For example, memory 1130 may include cache, ROM, RAM, or any kind of transitory or non-transitory computer-readable storage medium capable of storing computer-readable code. Memory 1130 may store various programming modules for execution by processor(s) 1120, including tracking module 1145, and other various applications 1135. Electronic device 1100 may also include storage 1140. Storage 1140 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage 1140 may be utilized to store various data and structures which may be utilized for storing data related to hand tracking and UI preferences. Storage 1140 may be configured to store hand tracking network 1155 according to one or more embodiments. In addition, storage 1140 may include enrollment data 1150, which may include data particular to a user being tracked, such as hand or eye characteristics, user-defined thresholds and processes, or the like. Electronic device may additionally include a network interface from which the electronic device 1100 can communicate across a network.

Electronic device 1100 may also include one or more cameras 1105 or other sensors 1110, such as a depth sensor, from which depth of a scene may be determined. In one or more embodiments, each of the one or more cameras 1105 may be a traditional RGB camera or a depth camera. Further, cameras 1105 may include a stereo camera or other multi-camera system. In addition, electronic device 1100 may include other sensors which may collect sensor data for tracking user movements, such as a depth camera, infrared sensors, or orientation sensors, such as one or more gyroscopes, accelerometers, and the like.

According to one or more embodiments, memory 1130 may include one or more modules that comprise computer-readable code executable by the processor(s) 1120 to perform functions. Memory 1130 may include, for example, tracking module 1145, and one or more application(s) 1135. Tracking module 1145 may be used to track locations of hands and other user motion in a physical environment. Tracking module 1145 may use sensor data, such as data from cameras 1105 and/or sensors 1110. In some embodiments, tracking module 1145 may track user movements to determine whether to trigger user input from a detected input gesture, such as hand tracking data, eye tracking data, or the like. Electronic device 1100 may also include a display 1125 which may present a UI for interaction by a user. The UI may be associated with one or more of the application(s) 1135, for example. Display 1125 may be an opaque display or may be semitransparent or transparent. Display 1125 may incorporate LEDs, OLEDs, a digital light projector, liquid crystal on silicon, or the like.

Although electronic device 1100 is depicted as comprising the numerous components described above, in one or more embodiments, the various components may be distributed across multiple devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 12:
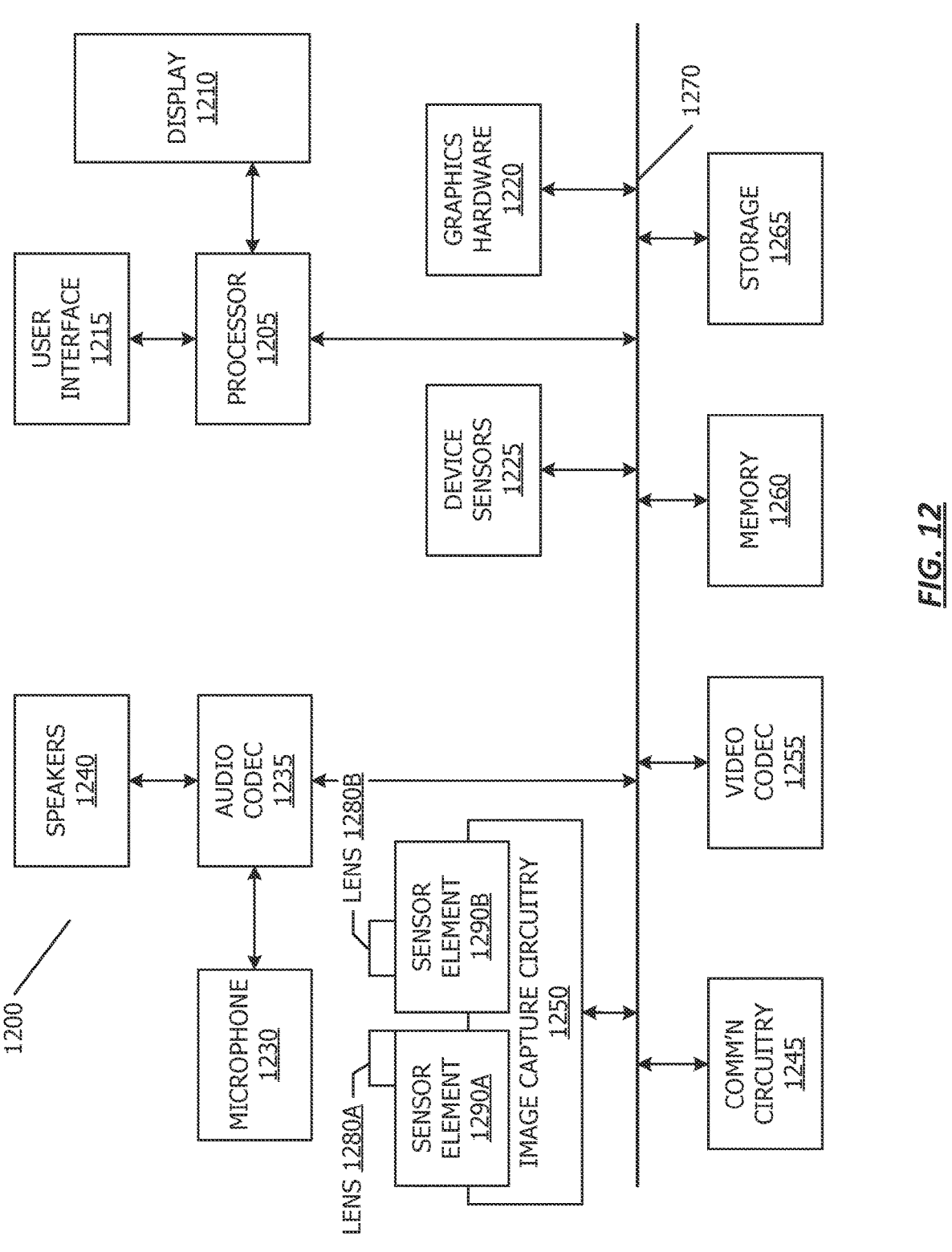
FIG. 12 shows an exemplary system for use in various extended reality technologies.

Referring now to FIG. 12, a simplified functional block diagram of illustrative multifunction electronic device 1200 is shown according to one embodiment. Each of electronic devices may be a multifunctional electronic device, or may have some or all of the described components of a multifunctional electronic device described herein. Multifunction electronic device 1200 may include processor 1205, display 1210, user interface 1215, graphics hardware 1220, device sensors 1225 (e.g., proximity sensor/ambient light sensor, accelerometer and/or gyroscope), microphone 1230, audio codec(s) 1235, speaker(s) 1240, communications circuitry 1245, digital image capture circuitry 1250 (e.g., including camera system), video codec(s) 1255 (e.g., in support of digital image capture unit), memory 1260, storage device 1265, and communications bus 1270. Multifunction electronic device 1200 may be, for example, a digital camera or a personal electronic device such as a personal digital assistant (PDA), personal music player, mobile telephone, or a tablet computer.

Processor 1205 may execute instructions necessary to carry out or control the operation of many functions performed by device 1200 (e.g., such as the generation and/or processing of images as disclosed herein). Processor 1205 may, for instance, drive display 1210 and receive user input from user interface 1215. User interface 1215 may allow a user to interact with device 1200. For example, user interface 1215 can take a variety of forms, such as a button, keypad, dial, a click wheel, keyboard, display screen, touch screen, gaze, and/or gestures. Processor 1205 may also, for example, be a system-on-chip such as those found in mobile devices and include a dedicated GPU. Processor 1205 may be based on reduced instruction-set computer (RISC) or complex instruction-set computer (CISC) architectures or any other suitable architecture and may include one or more processing cores. Graphics hardware 1220 may be special purpose computational hardware for processing graphics and/or assisting processor 1205 to process graphics information. In one embodiment, graphics hardware 1220 may include a programmable GPU.

Image capture circuitry 1250 may include two (or more) lens assemblies 1280A and 1280B, where each lens assembly may have a separate focal length. For example, lens assembly 1280A may have a short focal length relative to the focal length of lens assembly 1280B. Each lens assembly may have a separate associated sensor element 1290. Alternatively, two or more lens assemblies may share a common sensor element. Image capture circuitry 1250 may capture still and/or video images. Output from image capture circuitry 1250 may be processed by video codec(s) 1255 and/or processor 1205 and/or graphics hardware 1220, and/or a dedicated image processing unit or pipeline incorporated within circuitry 1265. Images so captured may be stored in memory 1260 and/or storage 1265.

Sensor and camera circuitry 1250 may capture still, and video images that may be processed in accordance with this disclosure, at least in part, by video codec(s) 1255 and/or processor 1205 and/or graphics hardware 1220, and/or a dedicated image processing unit incorporated within circuitry 1250. Images so captured may be stored in memory 1260 and/or storage 1265. Memory 1260 may include one or more different types of media used by processor 1205 and graphics hardware 1220 to perform device functions. For example, memory 1260 may include memory cache, read-only memory (ROM), and/or random-access memory (RAM). Storage 1265 may store media (e.g., audio, image and video files), computer program instructions or software, preference information, device profile information, and any other suitable data. Storage 1265 may include one more non-transitory computer-readable storage mediums including, for example, magnetic disks (fixed, floppy, and removable) and tape, optical media such as CD-ROMs and DVDs, and semiconductor memory devices such as EPROM and EEPROM. Memory 1260 and storage 1265 may be used to tangibly retain computer program instructions, or code organized into one or more modules and written in any desired computer programming language. When executed by, for example, processor 1205 such computer program code may implement one or more of the methods described herein.

Various processes defined herein consider the option of obtaining and utilizing a user's identifying information. For example, such personal information may be utilized in order to track motion by the user. However, to the extent such personal information is collected, such information should be obtained with the user's informed consent, and the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well established and in compliance with or above governmental/industry standards. Moreover, these parties will not distribute, sell, or otherwise share such information outside of any reasonable and legitimate purposes.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth), controlling the amount or specificity of data stored (e.g., collecting location data at city level rather than at an address level), controlling how data is stored (e.g., aggregating data across users), and/or other methods.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 1-6, 8, and 10 or the arrangement of elements shown in FIGS. 7, 9, and 11-12 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
obtaining a first plurality of camera frames;
detecting a first hand pose in a first camera frame of the first plurality of camera frames;
detecting a gesture based on the first hand pose in the first camera frame, wherein the gesture is associated with an input action; and
providing a gesture signal to enable the input action on a device in response to an intentionality classification for the gesture satisfying an intentionality parameter,
wherein the intentionality classification for the gesture is based on a set of additional hand poses from a second one or more camera frames of the first plurality of camera frames, wherein the first camera frame is different than the second one or more camera frames, and
wherein the intentionality parameter indicates that the gesture is intended to trigger the input action.

2. The method of claim 1, wherein determining the intentionality classification for the gesture based on the first hand pose comprises:
determining an intentionality score for the detected gesture, and
determining that the intentionality score satisfies a predetermined threshold.

3. The method of claim 1, further comprising:
determining whether a contact occurs between two fingers based on hand tracking image data associated with the first plurality of camera frames,
wherein the intentionality classification corresponds to an intended pinch gesture.

4. The method of claim 1, further comprising:
determining a second intentionality score for a second gesture in a second plurality of camera frames; and
in accordance with the second intentionality score failing to satisfy a threshold, ceasing enablement of an additional input action corresponding to the second gesture.

5. The method of claim 4, wherein the second plurality of camera frames is associated with a same hand as the first plurality of camera frames and is obtained at a different time.

6. The method of claim 1, wherein determining the intentionality classification for the gesture comprises:

obtaining gaze tracking data associated with the first plurality of camera frames; and determining that the gesture is intended as a user input gesture based on the gaze tracking image data.

7. A non-transitory computer readable medium comprising computer readable code executable by one or more processors to:

obtain a first plurality of camera frames;

detect a first hand pose in a first camera frame of the first plurality of camera frames;

detect a gesture based on the first hand pose in the first camera frame, wherein the gesture is associated with an input action; and provide a gesture signal to enable the input action on a device in response to an intentionality classification for the gesture satisfying an intentionality parameter, wherein the intentionality classification for the gesture is based on a set of additional hand poses from a second one or more camera frames of the first plurality of camera frames, wherein the first camera frame is different than the second one or more camera frames, and wherein the intentionality parameter indicates that the gesture is intended to trigger the input action.

8. The non-transitory computer readable medium of claim 7, wherein the computer readable code to determine the intentionality classification for the gesture based on the first hand pose comprises computer readable code to:

determine an intentionality score for the detected gesture, and determine that the intentionality score satisfies a predetermined threshold.

9. The non-transitory computer readable medium of claim 7, further comprising computer readable code to:

determine whether a contact occurs between two fingers based on hand tracking image data associated with the first plurality of camera frames, wherein the intentionality classification corresponds to an intended pinch gesture.

10. The non-transitory computer readable medium of claim 7, further comprising computer readable code to:

determine a second intentionality score for a second gesture in a second plurality of camera frames; and in accordance with the second intentionality score failing to satisfy a threshold, cease enablement of an additional input action corresponding to the second gesture.

11. The non-transitory computer readable medium of claim 10, wherein the second plurality of camera frames is associated with a same hand as the first plurality of camera frames and is obtained at a different time.

12. The non-transitory computer readable medium of claim 7, wherein the computer readable code to determine the intentionality classification for the gesture comprises computer readable code to:

obtain gaze tracking data associated with the first plurality of camera frames; and determine that the gesture is intended as a user input gesture based on the gaze tracking data.

13. A system comprising:

one or more processors; and one or more computer readable media comprising computer readable code executable by the one or more processors to:

obtain a first plurality of camera frames;

detect a first hand pose in a first camera frame of the first plurality of camera frames;

detect a gesture based on the first hand pose in the first camera frame, wherein the gesture is associated with an input action; and provide a gesture signal to enable the input action on a device in response to an intentionality classification for the gesture satisfying an intentionality parameter, wherein the intentionality classification for the gesture is based on a set of additional hand poses from a second one or more camera frames of the first plurality of camera frames, wherein the first camera frame is different than the second one or more camera frames, and wherein the intentionality parameter indicates that the gesture is intended to trigger the input action.

14. The system of claim 13, wherein the computer readable code to determine the intentionality classification for the gesture based on the first hand pose comprises computer readable code to:

determine an intentionality score for the detected gesture, and determine that the intentionality score satisfies a predetermined threshold.

15. The system of claim 13, further comprising computer readable code to:

determine whether a contact occurs between two fingers based on hand tracking image data associated with the first plurality of camera frames, wherein the intentionality classification corresponds to an intended pinch gesture.

16. The system of claim 13, further comprising computer readable code to:

determine a second intentionality score for a second gesture in a second camera frame; and in accordance with the second intentionality score failing to satisfy a threshold, cease enablement of an input action corresponding to the second gesture.

17. The system of claim 13, wherein the computer readable code to determine the intentionality classification for the gesture comprises computer readable code to:

obtain gaze tracking data associated with the first plurality of camera frames; and determine that the gesture is intended as a user input gesture based on the gaze tracking data.

* * * * *